(12) United States Patent
Hirooka

(10) Patent No.: US 12,189,671 B2
(45) Date of Patent: Jan. 7, 2025

(54) THESIS MAP CREATION METHOD AND THESIS MAP CREATION DEVICE

(71) Applicant: Kei Hirooka, Saitama (JP)

(72) Inventor: Kei Hirooka, Saitama (JP)

( * ) Notice: Subject to any disclaimer, the term of this patent is extended or adjusted under 35 U.S.C. 154(b) by 0 days.

(21) Appl. No.: 18/702,608

(22) PCT Filed: Dec. 1, 2022

(86) PCT No.: PCT/JP2022/044371
§ 371 (c)(1),
(2) Date: Apr. 18, 2024

(87) PCT Pub. No.: WO2023/145255
PCT Pub. Date: Aug. 3, 2023

(65) Prior Publication Data
US 2024/0330346 A1     Oct. 3, 2024

(30) Foreign Application Priority Data

Jan. 28, 2022   (JP) .................................. 2022-11566

(51) Int. Cl.
*G06F 16/338*   (2019.01)
*G06F 16/33*    (2019.01)

(52) U.S. Cl.
CPC ........ *G06F 16/338* (2019.01); *G06F 16/3344* (2019.01)

(58) Field of Classification Search
CPC .................................................. G06F 16/388
See application file for complete search history.

(56) References Cited

U.S. PATENT DOCUMENTS

2015/0154305 A1*  6/2015  Lightner ............. G06F 16/3347
                                                  707/726
2016/0147891 A1*  5/2016  Chhichhia ............ G06F 16/986
                                                  707/734

FOREIGN PATENT DOCUMENTS

| JP | H8-30799 A    | 2/1996  |
| JP | 2001-350793 A | 12/2001 |
| JP | 2007-109183 A | 4/2007  |

OTHER PUBLICATIONS

International Search Report of PCT/JP2022/044371 mailed on Jan. 31, 2023.
Written Opinion of the International Searching Authority of PCT/JP2022/044371 mailed on Jan. 31, 2023.

* cited by examiner

*Primary Examiner* — Van H Oberly
(74) *Attorney, Agent, or Firm* — IP Business Solutions, LLC

(57) ABSTRACT

A thesis map creation method easily obtains a thesis map to ascertain a correlation of theses through visual perception, and a thesis map creation device implements the method. A storage unit and a processing unit are prepared. The storage unit stores a plurality of conceptual levels, and registration terms or the like that belong to the plurality of conceptual levels. The processing unit sequentially executes, by each element thereof, processing of (a) extracting a feature term from an imported thesis and determining to which of the plurality of conceptual levels the feature term belongs, and (b) incorporating a node related to the thesis into a region of a lowest conceptual level among conceptual levels to which the feature term belongs.

8 Claims, 18 Drawing Sheets

FIG. 4

| CONCEPTUAL LEVEL | REGION OF CONCEPTUAL LEVEL C1 | REGION OF CONCEPTUAL LEVEL C2 | REGION OF CONCEPTUAL LEVEL C3 | REGION OF PROVISIONAL CONCEPTUAL LEVEL C4 |
|---|---|---|---|---|
| FEATURE TERM | ·CHEMISTRY (GENERAL)<br>·STRUCTURAL STATE OF MATTER<br>·CHEMICAL REACTION<br>· · · ·<br>·INORGANIC CHEMISTRY<br>·ELEMENT<br>·METAL AND NON-METAL<br>· · · ·<br>·ORGANIC CHEMISTRY<br>·SYNTHETIC ORGANIC COMPOUND<br>·NATURAL ORGANIC COMPOUND<br>· · · · | ·ATOM AND MOLECULE<br>·CHEMICAL FORMULA, AND CHEMICAL REACTION FORMULA<br>·ATOMIC STRUCTURE AND CHEMICAL BONDING<br>· · · ·<br>·METAL ELEMENT AND NON-METAL ELEMENT<br>·GROUP 1 METAL<br>· · · ·<br>·STRUCTURE OF ORGANIC COMPOUND MOLECULE<br>·ALIPHATIC HYDROCARBON<br>· · · | ·THREE STATES OF MATTER<br>·EQUATION OF STATE OF GAS<br>· · ·<br>·ALKALI METAL<br>·Na,Ka<br>·Mg,Ca<br>· · ·<br>·METHANE HYDROCARBON<br>·BENZENE<br>·ALDEHYDE<br>· · · | |

←HIGHER CONCEPT     LOWER CONCEPT→

THESIS MAP CREATION METHOD AND THESIS MAP CREATION DEVICE

CROSS-REFERENCE TO RELATED APPLICATIONS

This is the U.S. National Phase under 35 U.S.C. 371 of International Application No. PCT/JP2022/44371, filed on Dec. 1, 2022, which in turn claims the benefit of Japanese Patent Application No. 2022-11566, filed on Jan. 28, 2022, the disclosures of which are incorporated by reference herein.

BACKGROUND OF THE INVENTION

Field of the Invention

The invention relates to a thesis map creation method and a thesis map creation device for a thesis map for performing research support.

Description of the Related Art

A complex network is being focused on. A research target of the network is highly diverse, covering society, ecosystem, the Internet, and the like, and therefore, under a graph theory, connections between entities are represented by vertices (nodes) and sides (edges). For example, PTL 1 proposes an automatic layout method for a graph including a plurality of nodes and edges indicating relationships between the nodes.

In the course of various researches, related prior theses related to each research are examined, and if a correlation therebetween is clear, it is possible to find a direction in which the research is to be advanced while avoiding a redundant research, and it is possible to efficiently advance the research in a unique direction.

CITATION LIST

Patent Literature

PTL 1: JPH8-30799A

SUMMARY OF THE INVENTION

Technical Problem

However, when performing the research, in order to examine the related prior theses and clarify a correlation therebetween, it is necessary to discover the related prior theses and read the related prior theses to ascertain contents thereof. These successive actions and responses demand a large amount of time, and a burden thereof is heavy. In addition, there is no specific means for ascertaining the correlation between the related prior theses through visual perception.

The invention has been made in view of the above circumstances, and a first object thereof is to provide a thesis map creation method with which it is possible to easily obtain a thesis map in which a correlation between theses can be ascertained through visual perception. A second object is to provide a thesis map creation device for implementing the thesis map creation method.

In order to implement the first object, the invention has the following configurations (1) to (7).

(1) A thesis map creation method of importing information about a thesis into a processing device and creating a thesis map that systematically represents a correlation between theses using processing of the processing device, the thesis map creation method including:
preparing, as a storage device, a device configured to sequentially preset a plurality of conceptual levels from a higher concept to a lower concept for each target field, store a term corresponding to each conceptual level for the conceptual level as a registration term, store a base map that represents each conceptual level as a region that is a lower conceptual level as the region is further away from a highest element representation indicating the target field, and further store a subsequent base map change content; and
then sequentially executing, by the processing device, processing of following (a) and (b):
(a) extracting a feature term from the information about the imported thesis and collating identity between the feature term and the registration term stored in the storage device to determine to which of the plurality of conceptual levels stored in the storage device the feature term belongs, and
(b) incorporating, when there is a conceptual level to which the feature term belongs based on a collating result of the identity between the feature term and the registration term, a thesis position representation related to the imported thesis into the base map in a region of a lowest conceptual level among conceptual levels to which the feature term belongs.

In this configuration, noting the fact that development of knowledge, research contents, and the like tends to move from abstract to concrete (become clear) and that latest contents are often located at a lowest conceptual level, the storage device is prepared to enable visual recognition of a relative position of a conceptual height (higher or lower) of the imported thesis. In the storage device, the plurality of conceptual levels with different conceptual heights are sequentially preset for each target field, the term corresponding to each conceptual level is stored as the registration term for each conceptual level, the base map is stored to represent each of the plurality of conceptual levels as a region that is lower as the region is further away from the highest element representation indicating the target field, and the subsequent base map change content (update content) is also stored.

Therefore, information about theses is sequentially imported into the processing device, and the processing of the processing device is used to create the thesis map in which the information about each imported thesis is reflected. In this case, the thesis position representation indicating a thesis relative conceptual height (higher or lower) position for each thesis on the base map is incorporated into the thesis map. In the incorporation, the feature term (may be plural) extracted from the information about the thesis is collated with the registration term belonging to each conceptual level, and when the feature term belongs to any of the plurality of conceptual levels, the thesis position representation is incorporated into the region (base map) of the lowest conceptual level among the conceptual levels to which the feature term belongs.

Accordingly, by using this method, even when each thesis is not read, a latest thesis map is created (updated) in which the thesis position representation is newly incorporated each time information about each thesis is imported, and the latest thesis map can be easily obtained. As a result, by using the thesis map, the correlation between the theses can be ascertained through visual perception, and a research can be advanced in a unique direction. Here, "creation" of the thesis map is not limited to a case where the thesis position representation is incorporated onto the base map for a first time, and includes a case where another piece of thesis information is imported thereafter to newly incorporate (update) a thesis position representation related to a thesis thereof into the thesis map so far, a case where the thesis position representation on the thesis map is changed by a thesis position representation change operation, and the like.

(2) The configuration according to (1) described above, further including:

sequentially executing, by the processing device, processing of following (c) and (d) subsequent to the processing of (b):

(c) collating, when the conceptual level to which the feature term belongs is located at a level higher than the lowest conceptual level and there is already a thesis position representation related to another thesis in a region of the same conceptual level as the conceptual level to which the feature term belongs based on the collating result of the identity between the feature term and the registration term and a stored content in the storage device, relevance between the feature term and a feature term that is a basis for the thesis position representation of the other thesis at the same conceptual level, and (d) connecting by a line representation, when there is relevance between the collated feature terms, a thesis position representation in the region of the lowest conceptual level to the thesis position representation based on the other thesis in a region of a conceptual level closest to the lowest conceptual level among conceptual levels where the feature terms are relevant.

In this configuration, the thesis position representation indicating a thesis relative conceptual height (higher or lower) position for each thesis on the base map is incorporated into the thesis map. In the incorporation, the feature term (may be plural) extracted from the information about the thesis is collated with the registration term belonging to each conceptual level, and when the feature term belongs to any of the plurality of conceptual levels, the thesis position representation is incorporated into the region (base map) of the lowest conceptual level among the conceptual levels to which the feature term belongs.

When the feature term extracted from the information about the thesis belongs to a conceptual level higher than the lowest conceptual level whereas there is already a thesis position representation related to the other thesis in the region of the same conceptual level as the conceptual level to which the feature term belongs and there is relevance between the feature term that is the basis for the thesis position representation of the other thesis and the feature term that belongs to the conceptual level higher than the lowest conceptual level, the thesis position representation in the region of the lowest conceptual level and the thesis position representation related to the other thesis in the region of the conceptual level closest to the lowest conceptual level among the conceptual levels where the feature terms are relevant are connected by the line representation. Accordingly, by using this method, even when each thesis is not read, the latest thesis map is created (updated) in which the thesis position representation and the line representation are newly incorporated each time information about each thesis is imported, and the latest thesis map can be easily obtained. As a result, by using the thesis map, the correlation between the theses can be ascertained through visual perception, and a research can be advanced in a unique direction.

(3) The configuration according to (2) described above, in which the storage device stores, as the base map, a map in which a region of a provisional conceptual level is disposed outside the region of the lowest conceptual level among the plurality of conceptual levels, and when it is determined that there is the feature term which does not belong to any of the plurality of conceptual levels based on the collating result of the identity between the feature term and the registration term, the processing device regards the feature term as belonging to the provisional conceptual level and represents, in the region of the provisional conceptual level in the base map, the thesis position representation related to the thesis where the feature term is extracted.

In this configuration, it is noted that the feature term that is extracted by a feature term extraction unit and that does not belong to any of the plurality of conceptual levels is likely to be a latest content in the target field, the provisional conceptual level is set as a temporary conceptual level to which such a feature term should belong, the region of the provisional conceptual level is disposed outside the region of the lowest conceptual level among the plurality of conceptual levels, and the thesis position representation of the thesis is represented in the region of the provisional conceptual level. Accordingly, even when there is the feature term which does not belong to any of the plurality of conceptual levels, meaning of presence thereof can follow a tendency (meaning) that regions of the plurality of conceptual levels are lower conceptual level as the regions are further away from the highest element representation, and meaning of disposition of the thesis position representation represented in the region of the provisional conceptual level can be accurately recognized through visual perception.

(4) The configuration according to (3) described above, further including:

collating, when the thesis position representation related to the thesis where the feature term is extracted is represented in the region of the provisional conceptual level in the base map, the feature term belongs to any of the plurality of conceptual levels, and there is already a thesis position representation related to another thesis in a region of the same conceptual level as the conceptual level to which the feature term belongs, relevance between the feature term and a feature term that is a basis for the thesis position representation related to the other thesis at the same conceptual level; and connecting by a line representation, when there is relevance between the collated feature terms, the thesis position representation in the region of the provisional conceptual level to the thesis position representation related to the other thesis in a region of a conceptual level closest to the provisional conceptual level among conceptual levels where the feature terms are relevant; and connecting by a line representation, when there is no relevance between the collated feature terms, the thesis position representation in the region of the provisional conceptual level to the highest element representation.

According to this configuration, when the thesis position representation is represented in the region of the provisional conceptual level, the feature term is present at any of the plurality of conceptual levels, and further when there is already a thesis position representation related to the other thesis in the region of the same conceptual level as the conceptual level to which the feature term belongs, the relevance between the feature term present at any of the plurality of conceptual levels and the feature term serving as the basis for the thesis position representation related to the other thesis is collated. When there is relevance therebetween, the thesis position representation in the region of the provisional conceptual level and the thesis position representation related to the other thesis are connected by the line representation, when there is no relevance therebetween, the thesis position representation in the region of the provisional conceptual level and the highest element representation are connected by the line representation, and thus the relevance and connection between the thesis and the other thesis can be ascertained through visual perception even when the thesis position representation related to the thesis is represented in the region of the provisional conceptual level.

(5) The configuration according to (3) described above, further including:

cumulatively storing, each time when it is determined that the feature term belongs to the provisional conceptual level, the feature term and a number thereof in the storage device; and incorporating, when a cumulative number of the stored feature term is equal to or larger than a predetermined number, the provisional conceptual level into the plurality of conceptual levels as a lowest conceptual level of the plurality of conceptual levels in the storage device, regarding the stored feature term as a registration term belonging to the lowest conceptual level of the plurality of conceptual levels, and setting a new provisional conceptual level outside the region of the lowest conceptual level incorporated into the plurality of conceptual levels in the base map.

According to this configuration, when the cumulative number of the feature term determined as belonging to the provisional conceptual level is equal to or larger than the predetermined number, the provisional conceptual level so far is incorporated as the lowest conceptual level into the plurality of normal conceptual levels, the new provisional conceptual level is set outside the region of the lowest conceptual level in the base map, thus a scope indicated by the thesis map can be extended (extended and updated) as the number of theses increases along with research development, and the thesis map can correspond to the research development, passage of time, and the like.

(6) The configuration according to (1) described above, in which the storage device stores, as the base map, a map in which a region of a provisional conceptual level is disposed outside the region of the lowest conceptual level among the plurality of conceptual levels, and when it is determined that there is the feature term which does not belong to any of the plurality of conceptual levels based on the collating result of the identity between the feature term and the registration term, the processing device regards the feature term as belonging to the provisional conceptual level and represents, in the region of the provisional conceptual level in the base map, the thesis position representation related to the thesis where the feature term is extracted.

In this configuration, it is noted that the feature term that is extracted by a feature term extraction unit and that does not belong to any of the plurality of conceptual levels is likely to be a latest content in the target field, the provisional conceptual level is set as a temporary conceptual level to which such a feature term should belong, the region of the provisional conceptual level is disposed outside the region of the lowest conceptual level among the plurality of conceptual levels, and the thesis position representation of the thesis is represented in the region of the provisional conceptual level. Accordingly, even when there is the feature term which does not belong to any of the plurality of conceptual levels, meaning of presence thereof can follow a tendency (meaning) that regions of the plurality of conceptual levels are lower conceptual level as the regions are further away from the highest element representation, and meaning of disposition of the thesis position representation represented in the region of the provisional conceptual level can be accurately recognized through visual perception.

(7) The configuration according to (6) described above, further including:

cumulatively storing, each time when it is determined that the feature term belongs to the provisional conceptual level, the feature term and a number thereof in the storage device; and incorporating, when a cumulative number of the stored feature term is equal to or larger than a predetermined number, the provisional conceptual level into the plurality of conceptual levels as a lowest conceptual level of the plurality of conceptual levels in the storage device, regarding the stored feature term as a registration term belonging to the lowest conceptual level of the plurality of conceptual levels, and setting a region of a new provisional conceptual level outside the region of the lowest conceptual level incorporated into the plurality of conceptual levels in the base map.

According to this configuration, when the cumulative number of the feature term determined as belonging to the provisional conceptual level is equal to or larger than the predetermined number, the provisional conceptual level so far is incorporated as the lowest conceptual level into the plurality of normal conceptual levels, the region of the new provisional conceptual level is set outside the region of the lowest conceptual level in the base map, thus a scope indicated by the thesis map can be extended (extended and updated) as the number of theses increases along with research development, and the thesis map can correspond to the research development, passage of time, and the like.

In order to implement the second object, the invention has the following configurations (8) to (16).

(8) A thesis map creation device including a processing device configured to import information about a thesis, the thesis map creation device being configured to create a thesis map that systematically represents a correlation between theses using the processing device based on the information about the imported thesis, the thesis map creation device including:

a storage device configured to sequentially preset a plurality of conceptual levels from a higher concept to a lower concept for each target field, store a term corresponding to each conceptual level for the conceptual level as a registration term, store base map data that represents each conceptual level as a region that is a lower conceptual level as the region is further away from a highest element representation indicating the target field, and further store a subsequent base map data change content, in which the processing device includes:

a feature term extraction unit configured to extract a feature term from the information about the imported thesis;

a first collating unit configured to collate identity between the feature term extracted by the feature term extraction unit and the registration term of the storage device to determine to which of the plurality of conceptual levels the feature term belongs; and a first information incorporation unit configured to incorporate, into the base map data, when it is determined based on a result of the first collating unit that there is a conceptual level to which the feature term belongs, thesis position representation information about the imported thesis in a region of a lowest conceptual level among conceptual levels to which the feature term belongs.

According to this configuration, it is possible to specifically provide a thesis map creation device using the method of (1) described above.

(9) The configuration according to (8) described above, further including:

a second collating unit configured to collate, when it is determined based on the result of the first collating unit that the feature term is present at a conceptual level higher than the lowest conceptual level and it is determined based on a stored content in the storage device that there is already a thesis position representation related to another thesis in a region of the same conceptual level as the conceptual level to which the feature term belongs, relevance between the feature term and a feature term that is a basis for the thesis position representation related to the other thesis at the same conceptual level; and a second information incorporation unit configured to connect by a line representation, when it is determined based on a result of the second collating unit that there is relevance between the collated feature terms, a thesis position representation in the region of the lowest conceptual level to the thesis position representation based on the other thesis in a region of a conceptual level closest to the lowest conceptual level among conceptual levels where the feature terms are relevant.

According to this configuration, it is possible to specifically provide a thesis map creation device using the method of (2) described above.

(10) The configuration according to (9) described above, in which the storage device stores, as the base map data, data in which a region of a provisional conceptual level is disposed outside the region of the lowest conceptual level among the plurality of conceptual levels, and when it is determined that in the feature term extracted by the feature term extraction unit, there is the feature term which does not belong to any of the plurality of conceptual levels based on the collating result of the first collating unit, the first information incorporation unit regards the feature term as belonging to the provisional conceptual level and incorporates the thesis position representation information into the region of the provisional conceptual level in the base map data.

According to this configuration, it is possible to specifically provide a thesis map creation device using the method of (3) described above.

(11) The configuration according to (10) described above, in which when the first information incorporation unit incorporates the thesis position representation information about the thesis where the feature term is extracted into the region of the provisional conceptual level in the base map data, and it is determined based on the collating result of the first collating unit and the stored content in the storage device that the feature term belongs to any of the plurality of conceptual levels and that there is already a thesis position representation related to another thesis in a region of the same conceptual level as the conceptual level to which the feature term belongs, the second collating unit collates relevance between the feature term and a feature term that is a basis for the thesis position representation related to the other thesis at the same conceptual level, and when there is relevance between the collated feature terms, the second information incorporation unit connects by a line representation, the thesis position representation in the region of the provisional conceptual level to the thesis position representation related to the other thesis in a region of a conceptual level closest to the provisional conceptual level among conceptual levels where the feature terms are relevant, and when there is no relevance between the collated feature terms, the second information incorporation unit connects by a line representation, the thesis position representation in the region of the provisional conceptual level to the highest element representation.

According to this configuration, it is possible to specifically provide a thesis map creation device using the method of (4) described above.

(12) The configuration according to (10) described above, further including:

a storage processing unit configured to cumulatively store, each time when it is determined that the feature term belongs to the provisional conceptual level based on the collating result of the first collating unit, the feature term and a number thereof in the storage device; and an update processing unit configured to incorporate, when it is determined that a cumulative number of the stored feature term is equal to or larger than a predetermined number based on the stored content in the storage device, the provisional conceptual level into the plurality of conceptual levels as a lowest conceptual level of the plurality of conceptual levels in the storage device, store the stored feature term as a registration term belonging to the lowest conceptual level of the plurality of conceptual levels, and set a new provisional conceptual level outside the region of the conceptual level incorporated into the plurality of conceptual levels as the lowest conceptual level in the base map.

According to this configuration, it is possible to specifically provide a thesis map creation device using the method of (5) described above.

(13) The configuration according to (8) described above, in which the storage device stores, as the base map data, data in which a region of a provisional conceptual level is disposed outside the region of the lowest conceptual level among the plurality of conceptual levels, and when it is determined that in the feature term extracted by the feature term extraction unit, there is the feature term which does not belong to any of the plurality of conceptual levels based on the collating result of the first collating unit, the first information incorporation unit regards the feature term as belonging to the provisional conceptual level and incorporates the thesis position representation information into the region of the provisional conceptual level in the base map data.

According to this configuration, it is possible to specifically provide a thesis map creation device using the method of (6) described above.

(14) The configuration according to (13) described above, further including:
a storage processing unit configured to cumulatively store, each time when it is determined that the feature term belongs to the provisional conceptual level based on the collating result of the first collating unit, the feature term and a number thereof in the storage device; and
an update processing unit configured to incorporate, when it is determined that a cumulative number of the stored feature term is equal to or larger than a predetermined number based on the stored content in the storage device, the provisional conceptual level into the plurality of conceptual levels as a lowest conceptual level of the plurality of conceptual levels in the storage device, store the stored feature term as a registration term belonging to the lowest conceptual level of the plurality of conceptual levels, and set a region of a new provisional conceptual level outside the region of the conceptual level incorporated into the plurality of conceptual levels as the lowest conceptual level in the base map.

According to this configuration, it is possible to specifically provide a thesis map creation device using the method of (7) described above.

(15) The configuration according to (8) described above, further including:
a terminal device; and
a management server with which the terminal device is communicable via a network, in which
the terminal device includes an information input unit configured to enable import of thesis information and a display unit configured to display delivery information from the management server, and
the management server includes the storage device and the processing device.

According to this configuration, a specific configuration of the thesis map creation device can be obtained.

(16) The configuration according to (8) described above, further including:
a terminal device, in which
the terminal device includes an information input unit configured to enable import of thesis information, the storage device, the processing device, and a display unit configured to display processing information from the processing device.

According to this configuration, a specific configuration of the thesis map creation device can be obtained.

Advantageous Effects of Invention

According to the invention, it is possible to provide a thesis map creation method with which it is possible to easily obtain a thesis map in which a correlation of theses can be ascertained through visual perception. In addition, it is possible to specifically provide a thesis map creation device that implements the thesis map creation method.

BRIEF DESCRIPTION OF DRAWINGS

FIG. 4 is an explanatory diagram showing an example of a state in which three conceptual levels C1, C2, and C3 from a higher concept to a lower concept are set for each target field in a database unit in a management server, and registration terms are stored for each of the conceptual levels C1, C2, and C3.

DETAILED DESCRIPTION OF THE INVENTION

Figure 1:
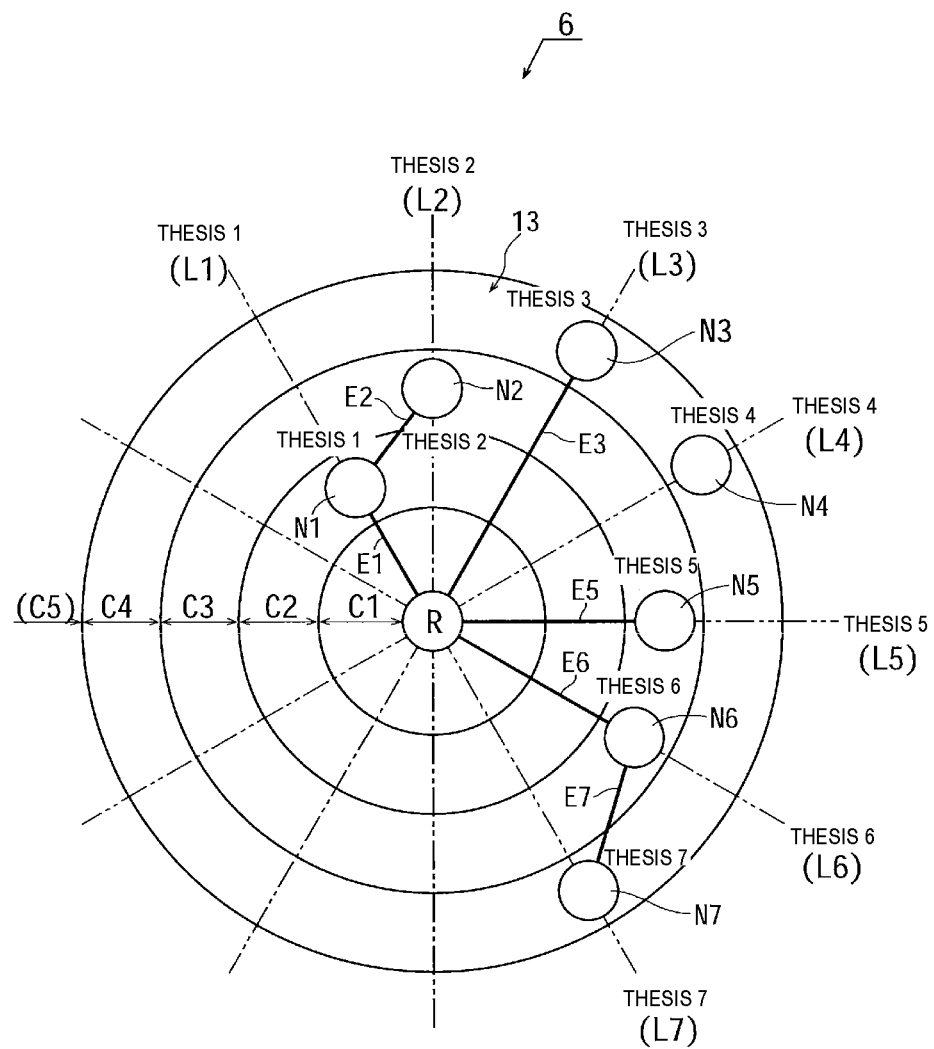
FIG. 1 is an explanatory diagram showing an example of a thesis map according to an embodiment.

Hereinafter, embodiments of the invention will be described with reference to the drawings.
[Thesis Map]
First, a thesis map creation method and a thesis map created by a thesis map creation device 1 using the method will be described. FIG. 1 shows an example of a thesis map 6 according to an embodiment. The thesis map 6 allows a correlation between theses to be intuitively ascertained through visual perception. Each time when information about a thesis is input into the thesis map creation device 1 to be described later, the latest thesis map 6 that reflects the information about the thesis is created (updated) by the thesis map creation device 1, and the latest thesis map 6 is displayed on a display unit of the thesis map creation device 1.

As shown in FIG. 1, the thesis map 6 is configured to represent, on a base map 13, for each thesis, a node N (a representative sign of a node) that is a thesis position representation indicating a position of the thesis with a circle, and an edge E (a representative sign of an edge) that is a line representation connecting the nodes N.

Figure 2:
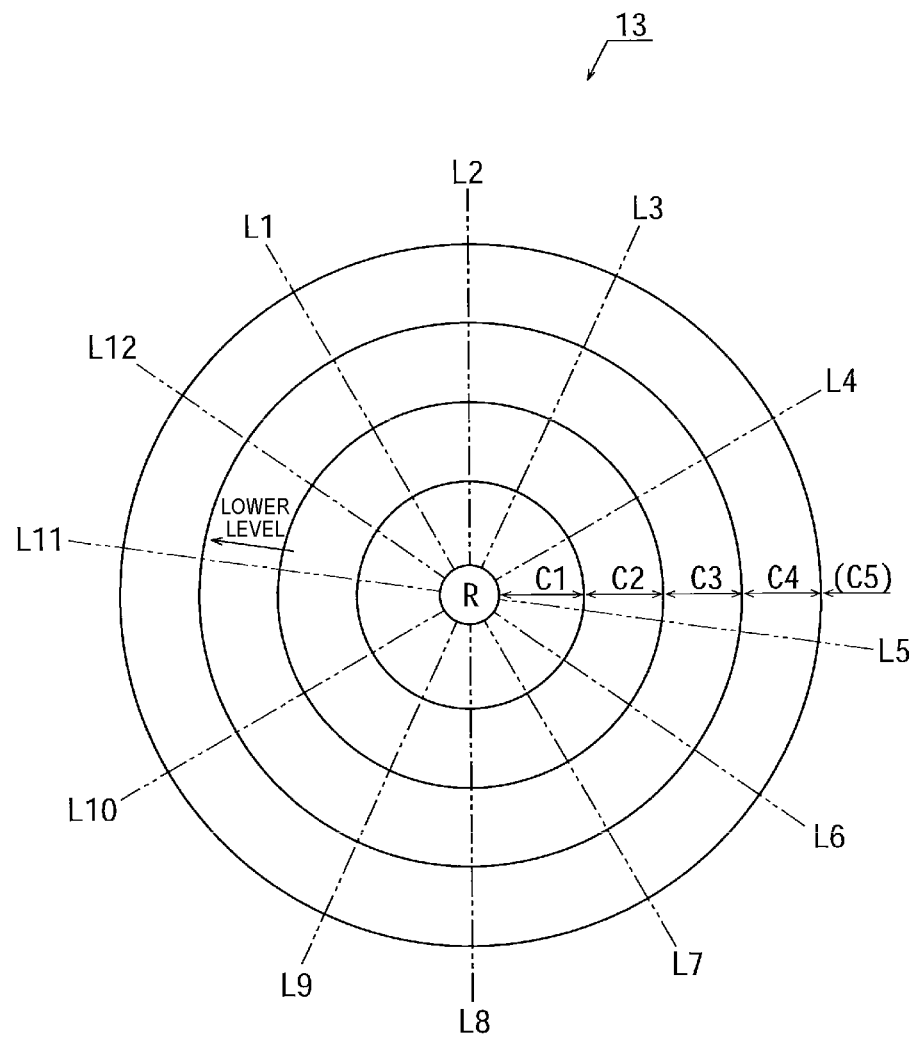
FIG. 2 is an explanatory diagram showing a base map that is a base of the thesis map in FIG. 1.

As shown in FIG. 2, in the base map, regions of a plurality of conceptual levels C1 to Cn and a provisional conceptual level Cn+1 are concentrically and sequentially set around a root R that is a highest element representation indicating a target field. The plurality of conceptual levels C1 to Cn are obtained by dividing a content of the target field from a higher concept toward a lower concept, each region of the plurality of conceptual levels C1 to Cn corresponds to a lower concept as the region is further away from the root R, and by representing the node N in any of these regions, it is possible to visually recognize to which of the conceptual levels C1 to Cn the thesis belongs. The provisional conceptual level Cn+1 is used when it is determined that the thesis does not belong to any of the plurality of conceptual levels C1 to Cn, and the region of the provisional conceptual level Cn+1 is disposed further outside (below) the region of the lowest conceptual level Cn among the plurality of conceptual levels C1 to Cn. In the embodiment, as the plurality of conceptual levels C1 to Cn, three conceptual levels C1, C2, and C3 are set from a higher concept to a lower concept, and a provisional conceptual level C4 is set as the provisional conceptual level Cn+1. A reason why each region of the plurality of conceptual levels C1 to C3 and the provisional conceptual level C4 in the base map 13 corresponds to a lower concept as the region is further away from the root R is that it is noted that development of knowledge, research contents, and the like tends to move sequentially from abstract to concrete (become clear) and that latest contents are often located at a lowest conceptual level, and it is conceivable that it is easy to visually perceive a concept height (high or low) through the base map 13 described above.

In the base map 13 in FIG. 2, reference numerals L1 to Ln denote virtual planned representation lines, and for each of the planned representation lines L1 to Ln, information (node N) about each thesis is represented along each of the planned representation lines L1 to Ln. The planned representation lines L1 to Ln are increased or decreased according to the number of imported theses from the viewpoint of visibility. Along with processing between the nodes N of the theses, disposition positions thereof are changed (disposition is changed such that the disposition positions are adjacent to each other) when necessary.

The node N is a node (vertex) represented in the region of any of the conceptual levels C1 to C4 on the base map 13 according to information (content) of a thesis related to the node. Accordingly, it is possible to ascertain a relative positional relationship of a concept height (high or low) of the thesis related to the node N relative to another thesis through visual perception. The edge E is an edge (side) that connects the nodes N (including the root R that is the highest concept representation) related to theses when there is relevance between the theses. Accordingly, relevance and connection between the theses can be ascertained through visual perception.

As a result, the correlation between the theses can be intuitively perceived by ascertaining the node N and the edge E on the thesis map 6 through visual perception, and a user can advance a research in a unique direction. By representing a research content of the user by the node N and the edge E, a position of the research content of the user relative to a related thesis can be objectively ascertained.

[Overview of Thesis Map Creation System 1A (Thesis Map Creation Device 1)]

Figure 3:
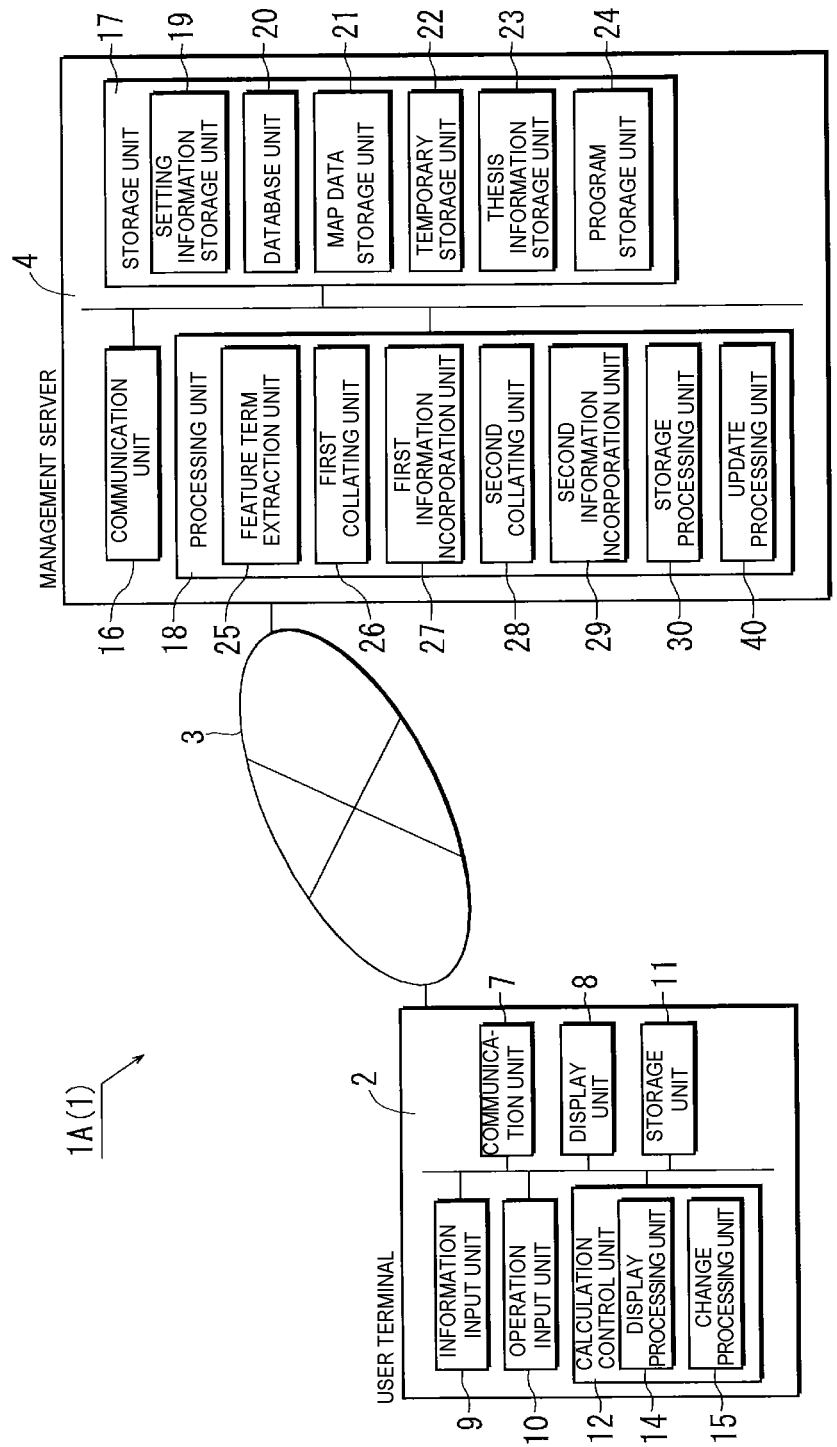
FIG. 3 is an overall configuration diagram showing a thesis map creation device (thesis map creation system) according to the embodiment.

Next, the thesis map creation device 1 for creating the thesis map 6 will be described. In the embodiment, the thesis map creation device 1 is implemented by a thesis map creation system 1A, and as shown in FIG. 3, the thesis map creation system 1A includes a user terminal 2 as a terminal device and a management server 4 with which the user terminal 2 is communicable via a communication network 3 such as the Internet. Accordingly, in the thesis map creation system 1A, based on transmission of thesis information or the like from the user terminal 2 to the management server 4, the management server 4 executes predetermined processing to create or update thesis map information (map data), and delivers the thesis map information as delivery information to the user terminal 2. As a result, the thesis map (graph) 6 is displayed on a display unit of the user terminal 2 as shown in FIG. 1 (an example of the thesis map 6), and the node (thesis position representation) N and the edge (line representation) E related to each imported thesis are represented in the thesis map 6.

[User Terminal 2]

The user terminal 2 may be a mobile terminal device such as a smartphone or a tablet terminal, or a communicable terminal device such as a personal computer (PC). As shown in FIG. 3, the user terminal 2 includes a communication unit 7 that communicates with the management server 4, a display unit 8 that displays the delivery information and the like from the management server 4, an information input unit (for example, a scanner) 9 that imports information such as the thesis information, an operation input unit (keyboard) 10 that inputs a request operation, a storage unit 11, and a calculation control unit 12.

The storage unit of the user terminal 2 includes a storage element such as a read only memory (ROM) or a random access memory (RAM), and the storage unit 11 stores, in addition to a basic program necessary for operating the user terminal 2, a display program (delivery information display program) for displaying the node N indicating a relative position of theses and the edge E connecting the nodes N on the base map 13 (see FIG. 1), a change program for changing positions and disposition postures of the node N and the edge E by a change operation (for example, a dragging operation), setting information, and the like. The various programs and the like are read by the calculation control unit 12 as necessary, and necessary information (input information from the information input unit 9 and the operation input unit 10, the delivery information from the management server 4, and the like) is appropriately stored in the storage unit 11.

As shown in FIG. 3, the calculation control unit 12 functions as a display processing unit 14, a change processing unit 15, and the like based on a program read from the storage unit 11. Specifically, the display processing unit 14 receives the thesis map information as the delivery information from the management server 4, and thus functions to display, on the display unit 8, the thesis map 6 in which the node N and the edge E are disposed on the base map 13. The change processing unit 15 functions to change, through a change operation such as dragging, the disposition position of the node N, the disposition position and the disposition posture of the edge E on the base map 13 displayed on the display unit 8.

[Management Server 4]

As the management server 4, either a single server or a cloud server may be used. As shown in FIG. 3, the management server 4 includes a communication unit 16 for communicating with the user terminal 2, a storage unit 17 as a storage device that stores various types of information (thesis information and the like) received from the user terminal 2 via communication units 3, 7, and 16, and stores stored information prepared in advance, and a processing unit (calculation control unit) 18 as a processing device that executes various types of processing such as analysis related to the thesis information received from the user terminal 2.

A specific description will be given. The storage unit 17 includes a storage element such as a read only memory (ROM) and a random access memory (RAM). In order to store necessary information, the storage unit 17 includes a setting information storage unit 19, a database unit 20, a map data storage unit 21, a temporary storage unit 22, a thesis information storage unit 23, a program storage unit 24, and the like.

The setting information storage unit 19 stores setting information such as constants, fixed values, and base map data displayed as the base map 13 at the user terminal 2. In the database unit 20, the plurality of conceptual levels C1 to Cn are sequentially set from a higher concept to a lower concept for each target field, and a large number of terms corresponding to the conceptual levels C1 to Cn are stored as registration terms for each of the plurality of conceptual levels C1 to Cn. In the embodiment, as the plurality of conceptual levels C1 to Cn, initially, three conceptual levels C1, C2, and C3 are sequentially set, and a large number of terms corresponding to the respective conceptual levels C1, C2, and C3 are stored as registration terms for each of the three conceptual levels C1, C2, and C3. FIG. 4 shows an example in which the three conceptual levels C1, C2, and C3 are set from a higher concept to a lower concept, and registration terms are stored for each of the conceptual levels C1, C2, and C3, with general chemistry being the target field. As described above, the setting information storage unit 19 stores the base map data. The base map data is displayed at the user terminal 2 as the base map 13 shown in FIG. 2, the base map 13 is displayed such that each region of the plurality of conceptual levels C1, C2, and C3 corresponds to a lower concept as the region is further away from the root R that is the highest element representation indicating the target field as described above with reference to FIG. 2 (R→C1→C2→C3), and the region of the provisional conceptual level C4 is represented further outside (below) the lowest conceptual level C3 among the plurality of conceptual levels C1, C2, and C3. In the embodiment, boundary lines between the regions are indicated by concentric circles having different diameters.

The map data storage unit 21 stores map data in which information is incorporated into the base map data based on processing by the processing unit 18. In the map data, when new information is incorporated or incorporated information is changed, at that time, the changed map data is updated and stored as the map data. As will be described later, when it is determined that a feature term extracted from the thesis information does not belong to any of the plurality of conceptual levels C1, C2, and C3 but belongs to the provisional conceptual level C4, the feature term and a number thereof are cumulatively and temporarily stored in the temporary storage unit 22. The thesis information received from the user terminal 2 is accumulated and stored in the thesis information storage unit 23. In the program storage unit 24, in addition to a basic program, programs for executing various types of processing in the processing unit 18 are stored for the purpose of storing necessary programs.

The processing unit (calculation control unit) 18 includes a central processing unit (CPU) and functions, based on a program read from the storage unit 17, as a feature term extraction unit 25, a first collating unit 26, a first information incorporation unit 27, a second collating unit 28, a second information incorporation unit 29, a storage processing unit 30, an update processing unit 40, and the like as shown in FIG. 3. Details thereof will be described later.

[Overview of Overall Processing of Thesis Map Creation System 1A]

Next, overall processing of the thesis map creation system 1A will be described with reference to FIGS. 5 and 6.

Figure 7:
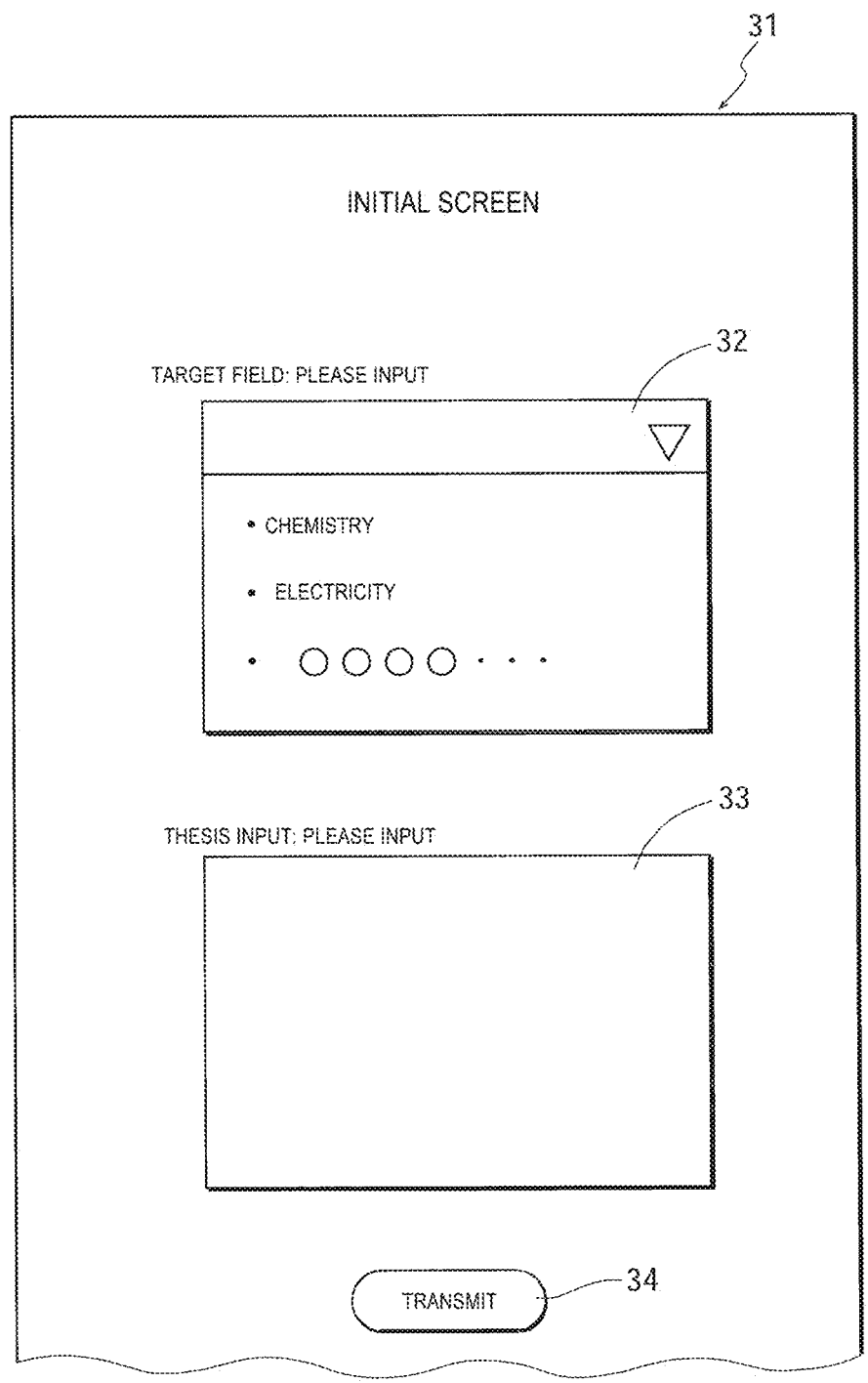
FIG. 7 is an explanatory diagram showing an initial screen displayed based on initial screen information delivered from the management server to the user terminal.

(1) In the thesis map creation system 1A, the management server 4 transmits initial screen information to the user terminal 2 under a condition that the user terminal 2 accesses the management server 4, and the user uses the initial screen information to transmit information about the target field and the thesis to the management server 4. The initial screen information is displayed as an initial screen 31 on the display unit 8 of the user terminal 2 as shown in FIG. 7, and the initial screen 31 is provided with a target field input field 32 for inputting the target field, a thesis input field 33, and a transmission display (transmission button) 34. The target field input field 32 is a field for inputting the target field desired by the user by direct input or by selecting one of a plurality of pulled-down choices. The thesis input field 33 is a field for inputting the thesis information desired by the user by copy paste or the like. As the thesis information to be input to the thesis input field 33, information received from the information input unit 9, information downloaded from a thesis accumulation site, or the like is used. The transmission display 34 becomes active based on input to the target field input field 32 and the thesis input field 33, and by selecting (clicking) the transmission display 34 in such an active state, input information input into the target field input field 32 and the thesis input field 33 is transmitted to the management server 4.

(2) In the thesis map creation system 1A, when the management server 4 receives the thesis information from the user terminal 2, the processing unit 18 of the management server 4 sequentially executes the following processing to create the thesis map information (map data).

Figure 5:
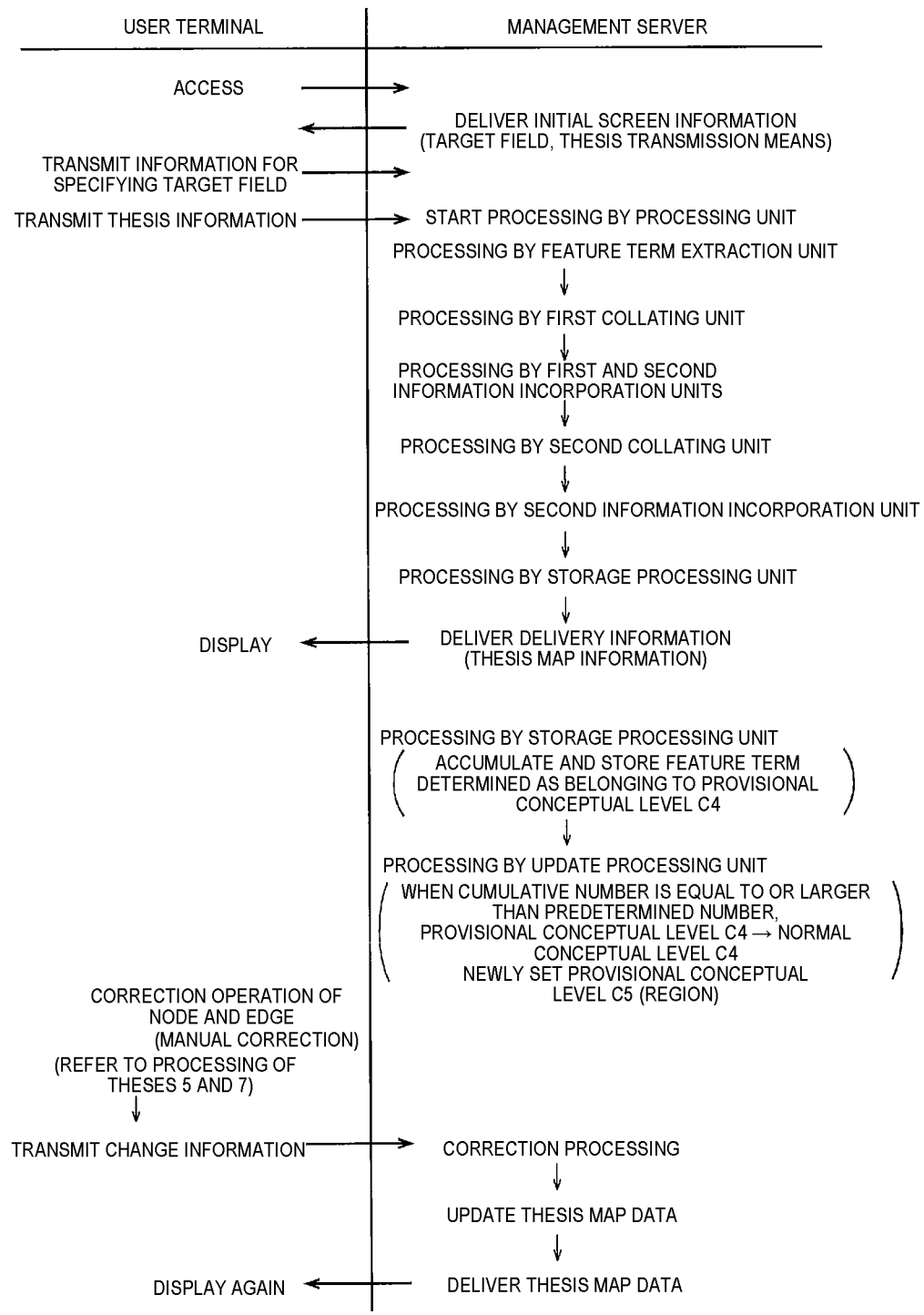
FIG. 5 is an explanatory diagram showing processing contents of a user terminal and the management server.
Figure 6:
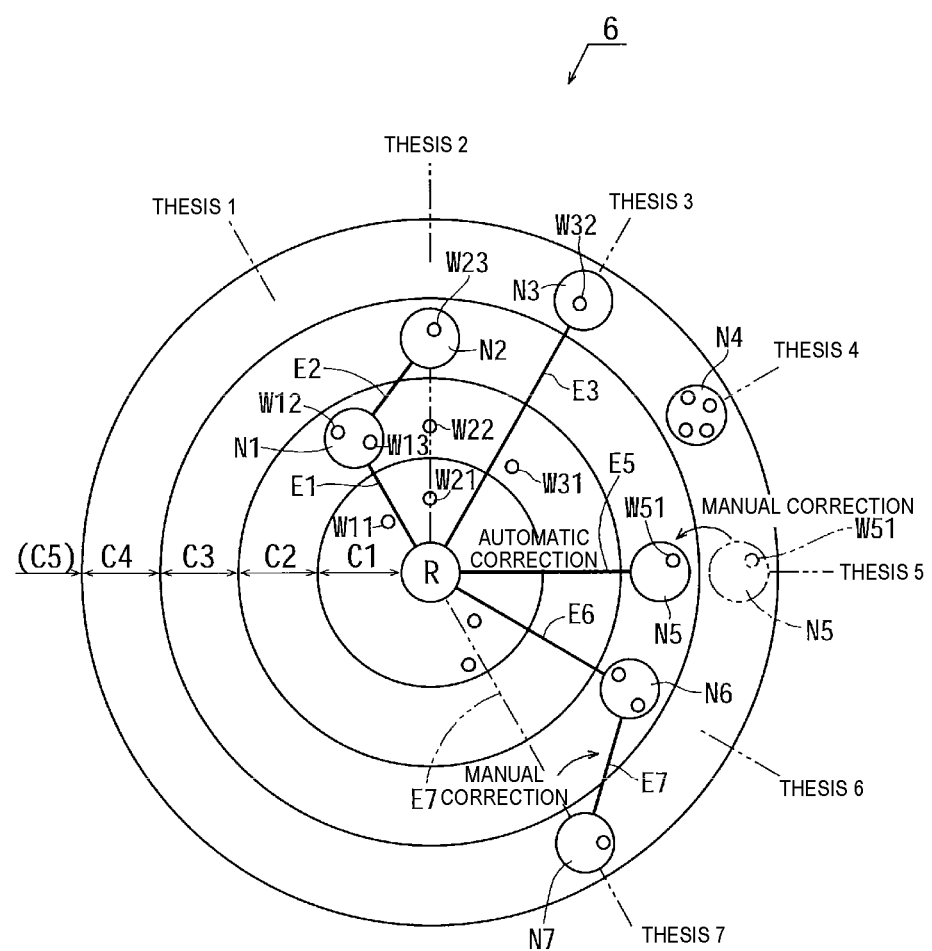
FIG. 6 is an explanatory diagram showing a processing example in the thesis map according to the embodiment.

(2-1) As shown in FIG. 5, the feature term extraction unit 25 of the processing unit 18 extracts a feature term from information about a received thesis. In this case, as the information about the thesis where the feature term is extracted, any one of the entire thesis, a title of the thesis, and a summary (abstract) of the thesis, or both the title of the thesis and the abstract of the thesis may be appropriately selected, and in the extraction of the feature term, an extraction target can be set to a term such as a phrase or a word in the thesis information as appropriate.

Figure 8:
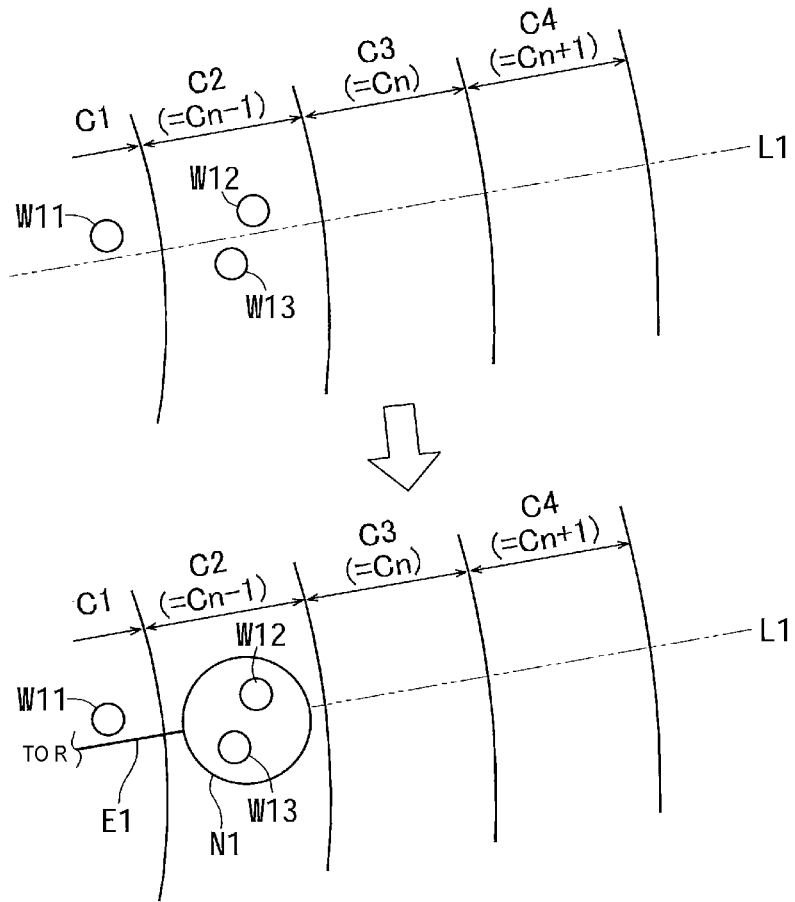
FIG. 8 is an explanatory diagram showing a processing example of a thesis 1 in the thesis map.

(2-2) When the extraction of the feature term by the feature term extraction unit 25 is finished, as shown in FIG. 5, the first collating unit 26 of the processing unit collates identity between the feature term and a registration term stored in the database unit 20 of the storage unit 17, and determines to which of the plurality of conceptual levels C1 to C3 where the registration term belongs the feature term belongs. In this case, the collating (determination) of the identity between the feature term and the registration term is not limited to a case where the feature term and the registration term are exactly the same, and appropriate processing may be executed, such as determining the identity for a registration term including the feature term by performing a fuzzy search using a LIKE operator of SQL statement. FIG. 8 is a conceptual diagram showing the processing content described above using a processing example of a thesis 1 shown in FIG. 6. In an upper portion of FIG. 8, the first collating unit 26 determines that a feature term w11 belongs to the conceptual level C1 and feature terms w12 and w13 belong to the conceptual level C2 among a plurality of feature terms (indicated by small circles) w (used as a representative sign of the feature term) extracted by the feature term extraction unit 25.

(2-3) When the determination by the first collating unit 26 is finished and it is determined to which of the conceptual levels C1 to C3 the feature term belongs, as shown in FIG. 5, the first information incorporation unit 27 of the processing unit 18 incorporates information about a node N1 of the thesis 1 into the map data such that the node N1 is represented in a region of a lowest conceptual level among the conceptual levels to which the feature term belongs, and the second information incorporation unit 29 incorporates information about an edge E1 (line representation) into the map data such that the node N1 is represented as being connected to the root R indicating the target field with the edge E1. If the above-described processing of the thesis 1 is continued as an example, based on a result shown in the upper portion of FIG. 8, the first information incorporation unit 27 incorporates the information about the node N1 into the base map data such that the node N1 of the thesis 1 is displayed in the region of the conceptual level C2 that is the lowest conceptual level among the conceptual levels to which the feature term belongs, as shown in a lower portion in FIG. 8, and the second information incorporation unit 29 incorporates the information about the edge E1 into the map data such that the node N1 and the root R are represented as being connected by the edge E1. A reason why the node is represented in the region of the lowest conceptual level among the conceptual levels to which the feature term belongs is that it is noted that development of knowledge, research contents, and the like tends to move from abstract to concrete (become clear) and that latest contents are often located at a lowest conceptual level, and such a fact is utilized through a location of the feature term. A reason why the root R and the node N1 are represented as being connected by the edge E1 is that it is clear that the feature term that is a basis for the node N belongs to any of the plurality of conceptual levels C1 to C3 for the target field and is related to the target field.

(2-4) On the other hand, when the first collating unit 26 determines that in the feature term extracted by the feature term extraction unit 25, there is the feature term which does not belong to any of the conceptual levels C1 to C3, the first information incorporation unit 27 incorporates the information about the node N into the map data such that the node N is represented in the region of the provisional conceptual level C4. This is because the feature term that does not show identity with any of the registration terms belonging to the conceptual levels C1 to C3 can be regarded as a latest and specific term (belonging to a lower conceptual level) or a completely different term. In this case, when in the feature term extracted by the feature term extraction unit 25, there is the feature term which belongs to the conceptual levels C1 to C3 as well as the provisional conceptual level C4, the second information incorporation unit 29 incorporates the information about the edge E into the map data such that in the thesis map 6 the node N in the region of the provisional conceptual level C4 and the root R are represented as being connected by the edge E. This is because, as long as there is a feature term determined as belonging to the conceptual levels C1 to C3, it can be estimated that although the feature term belongs to the provisional conceptual level C4, the feature term is relevant to the target field. In this regard, according to the determination of the first collating unit 26, when the feature term extracted by the feature term extraction unit 25 is limited to be a feature term belonging to the provisional conceptual level C4 and there is no feature term belonging to the conceptual levels C1 to C3, the first information incorporation unit 27 incorporates the information about the node N to be positioned in the region of the provisional conceptual level C4 into the map data such that the node is represented in an independent (isolated) state in the region of the provisional conceptual level C4, and the second information incorporation unit 29 does not incorporate, into the map data, the information about the edge E that connects the node N in the region of the provisional conceptual level C4 to the root R.

Figure 9:
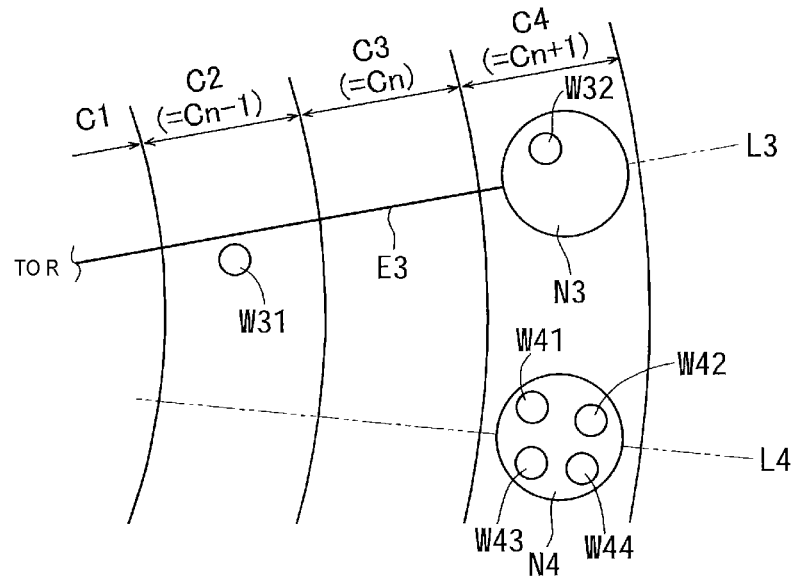
FIG. 9 is an explanatory diagram showing a processing example of theses 3 and 4 in the thesis map.

(2-5) The above-described contents will be specifically described with reference to processing examples of theses 3 and 4 shown in FIGS. 6 and 9. As for the thesis 3, since a feature term w32 belongs to the region of the provisional conceptual level C4 and a feature term w31 belongs to the conceptual level C2 other than the provisional conceptual level among feature terms extracted by the feature term extraction unit 25, the first and second information incorporation units 27 and 29 incorporate information about a node N3 and information about an edge E3 into the map data such that the node N3 is represented in the region of the provisional conceptual level C4 and the edge E3 connecting the node N3 and the root R is represented on the thesis map 6. For the thesis 4, since it is determined that feature terms w41 to w44 extracted by the feature term extraction unit 25 do not belong to any of the conceptual levels C1 to C3 but belong to the region of the provisional conceptual level, the first information incorporation unit 27 incorporates information about a node N4 into the map data such that the node N4 is represented independently (isolatedly) in the region of the provisional conceptual level on the thesis map 6, and the second information incorporation unit 29 does not incorporate the information about the edge E into the map data.

(2-6) When the incorporation processing of the first and second information incorporation units 27 and 29 and the like are finished and when it is determined based on a collating result of the first collating unit 26 and a stored content (map data) in the storage unit 17 that the feature term extracted by the feature term extraction unit 25 belongs not only to the lowest conceptual level among the conceptual levels C1 to C3 but also to a conceptual level higher than the lowest conceptual level, and that there is already a node N related to another thesis in a region of the same conceptual level as the higher conceptual level to which the feature term belongs, the second collating unit 28 collates relevance between the feature term and a feature term that is a basis for the node N of the other thesis at the same conceptual level. This is to determine the relevance between the theses. In this case, various methods including the same determination as the identity determination of the first collating unit 26 can be used for collating (determining) the relevance between the feature term extracted by the feature term extraction unit 25 and the feature term that is the basis for the node N of the other thesis.

Figure 10:
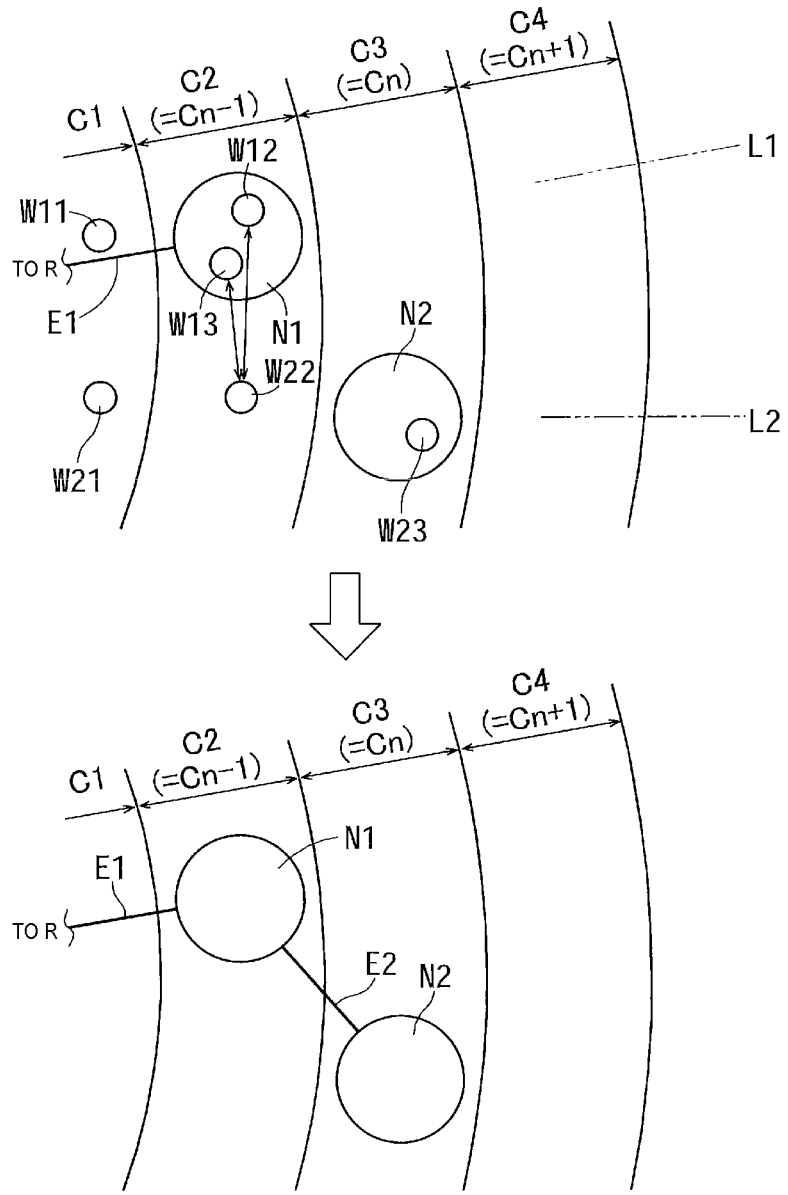
FIG. 10 is an explanatory diagram showing a processing example of a thesis 2 relative to the thesis 1 in the thesis map.

(2-7) An upper portion of FIG. 10 shows the processing contents described above with reference to a specific processing example of a thesis 2 relative to the thesis 1. In the thesis 2, a feature term w21 belongs to the conceptual level C1, a feature term w22 belongs to the conceptual level C2, and a feature term w23 belongs to the conceptual level C3. For this reason, the first information incorporation unit 27 incorporates information about a node N2 into the map data such that the node N2 is represented in the region of the conceptual level C3 that is the lowest conceptual level among these conceptual levels. In the thesis 2, the feature terms w21 and w22 also belong to the conceptual levels C1 and C2 higher than the conceptual level C3 that is the lowest conceptual level, and among these, there is already the node N1 of the thesis 1 (another thesis) in the region of the conceptual level C2 to which the feature term w22 belongs. Therefore, the second collating unit 28 determines such a fact, and determines relevance between the feature term w12 or w13 that is a basis for the node N1 and the feature term w22 of the thesis 2.

(2-8) When the processing of the second collating unit 28 is finished and when it is determined that there is relevance between the collated feature terms based on a collating result of the second collating unit 28, the second information incorporation unit 29 further determines a conceptual level closest to the lowest conceptual level among the conceptual levels where the feature terms are relevant, and incorporates information about an edge E2 into the map data such that the node N in the region of the lowest conceptual level and the node N based on the other thesis represented in a region of a conceptual level closest to the lowest conceptual level among the conceptual levels where the feature terms are relevant are connected with the edge E2.

If a processing content (see FIG. 10) of the thesis 2 relative to the thesis 1 is continued as an example, the second information incorporation unit 29 determines whether there is relevance between the feature term w12 or w13 that is the basis for the node N1 of the thesis 1 that is the other thesis and the feature term w22 of the thesis 2 based on the collating result of the second collating unit 28, and when it determines that there is relevance, as shown in a lower portion of FIG. 10, the information about the edge E2 is incorporated into the map data such that the node N2 and the node N1 are connected with the edge E2. In this case, since the node N1 of the thesis 1 that is the other thesis is present only in the conceptual level C2 to which the feature term w22 belongs, in this processing example, the conceptual level C2 is the conceptual level closest to the lowest conceptual level C3 among the conceptual levels where the feature terms are relevant.

(2-9) When the above-described processing is finished, the storage processing unit 30 stores the map data in which processing information of the processing device 18 is incorporated as latest map data in the map data storage unit 21 of the storage unit 17. The storage processing unit 30 incorporates, into the map data at any time, not only information based on the series of processing described above but also change information on the thesis map 6 from the user terminal 2 to make the map data up-to-date. The thesis map information thus created or updated is delivered to the user terminal 2 as delivery information through the communication unit 16 and the network 3, and the latest thesis map 6 is displayed on the display unit 8 of the user terminal 2. As a result, the user can easily obtain the latest thesis map 6 in which information (the node N and the like) of each related thesis is incorporated without reading the thesis, and a burden on the user is reduced. In this case, all or a part of an identification code or a thesis title are shown on each node N in the thesis map 6 in order to indicate on which thesis the node N is based, further, corresponding thesis information in the storage unit 17 (thesis information storage unit 23) is associated with each node N by using a hyperlink or the like, and the corresponding thesis information in the storage unit 17 can be accessed by selecting (clicking) the node N.

(2-10) For each of a plurality of theses, the series of processing described above is executed, and when it is determined that the feature term extracted by the feature term extraction unit 25 should belong to the provisional conceptual level C4 without belonging to any of the conceptual levels C1 to C3, the feature term w and a number thereof are cumulatively stored in the storage unit 17 (temporary storage unit 22). When it is determined that a cumulative number wt of the temporarily stored feature term is equal to or larger than a predetermined number w0, the update processing unit 40 incorporates the provisional conceptual level C4 so far as the lowest conceptual level C4 subsequent to the conceptual level C3 into the plurality of normal conceptual levels C1 to C3 having a concept of a hierarchical relationship, and stores the feature term temporarily stored so far as a registration term belonging to the conceptual level C4 in the database unit 20. The update processing unit 40 sets a new provisional conceptual level C5 along with such a change from the provisional conceptual level C4 to the normal conceptual level C4, disposes a region of the provisional conceptual level C5 outside (below) the conceptual level C4, and stores a content thereof at a lowest position in the storage unit 17, similarly to the case of the provisional conceptual level C4. Accordingly, thereafter, also in processing of the provisional conceptual level C5, when it is determined that the feature term extracted by the feature term extraction unit 25 does not belong to any of the plurality of conceptual levels C1 to C4, the feature term is regarded as belonging to the provisional conceptual level C5 as in the case of the provisional conceptual level C4, and the feature term and the cumulative number are temporarily stored in the storage unit 17 (see FIG. 5).

(3) When the map data (thesis map information) is delivered from the management server 4 to the user terminal 2, the thesis map 6 as shown in FIG. 1 is displayed on the display unit 8 of the user terminal 2 as described above.

(3-1) In this case, as shown in FIG. 5, the user can change the disposition position of the node N, the disposition position and the disposition posture of the edge E, and the like by a change operation such as a dragging operation (manual correction) while viewing the thesis map 6 through the display unit 8 of the user terminal 2. This is because, although the thesis map 6 can be obtained and a correlation between related theses can be ascertained through visual perception by the thesis map 6 without reading contents of the related theses, a content of the thesis map 6 may not always be a content according to an intention of the user. Therefore, the user can change, based on the change processing unit 15 of the user terminal 2, the disposition position of the node N, the disposition position and the disposition posture of the edge E, and the like on the thesis map 6 by the dragging operation or the like while viewing the thesis map 6 displayed on the display unit 8. Such changed information (information about the node N and information about the edge E) is transmitted to the management server 4, the management server 4 performs predetermined processing (correction processing) based on the received information, and processing information thereof is incorporated into the map data (thesis map information). The updated latest map data is stored in the storage unit 17 by the storage processing unit 30 and is delivered to the user terminal 2 by the communication unit 16, and the thesis map 6 corrected to the content intended by the user is displayed on the display unit 8 of the user terminal 2.

Figure 11:
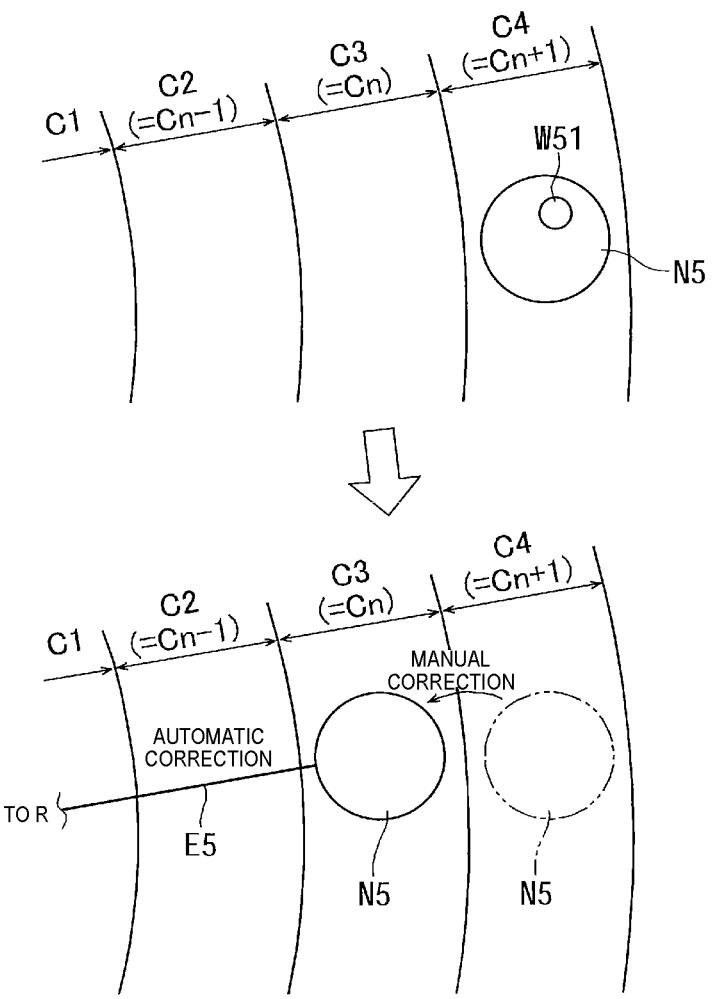
FIG. 11 is an explanatory diagram showing manual correction of a node of a thesis 5 in the thesis map.

A position change of the node N will be specifically described with reference to a processing example of a thesis 5 shown in FIGS. 6 and 11. In processing of the thesis 5, it is determined that a feature term w51 extracted by the feature term extraction unit 25 does not belong to any of the conceptual levels C1 to C3, and it is assumed that a node N5 is independently (isolatedly) disposed in the region of the provisional conceptual level C4 (see an upper portion of FIG. 11). However, when the user moves the node N5 to the region of the conceptual level C3 by a dragging operation or the like on an assumption that a position of the node N5 is not intended, information thereof is transmitted to the management server 4, and the management server 4 executes predetermined correction processing based on the information and updates the map data so far to the latest map data in which the processing information is incorporated. This map data is delivered to the user terminal 2, and the node N5 is displayed in a state of remaining in the region of the conceptual level C3 that is a movement destination, and an edge E5 connecting the thesis node N5 whose movement is finished and the root R is newly displayed by automatic correction (see a lower portion in FIG. 11). In this case, it is determined whether there is the feature term w51 that is a basis for the node N5, as the registration term belonging to the conceptual level C3 that is the movement destination, and when there is not the feature term w51 as the registration term belonging to the conceptual level C3 that is the movement destination, the feature term w51 is stored as a registration term belonging to the conceptual level C3. On the other hand, the feature term w51 temporarily stored in the temporary storage unit 22 of the storage unit 17 is deleted.

Figure 12:
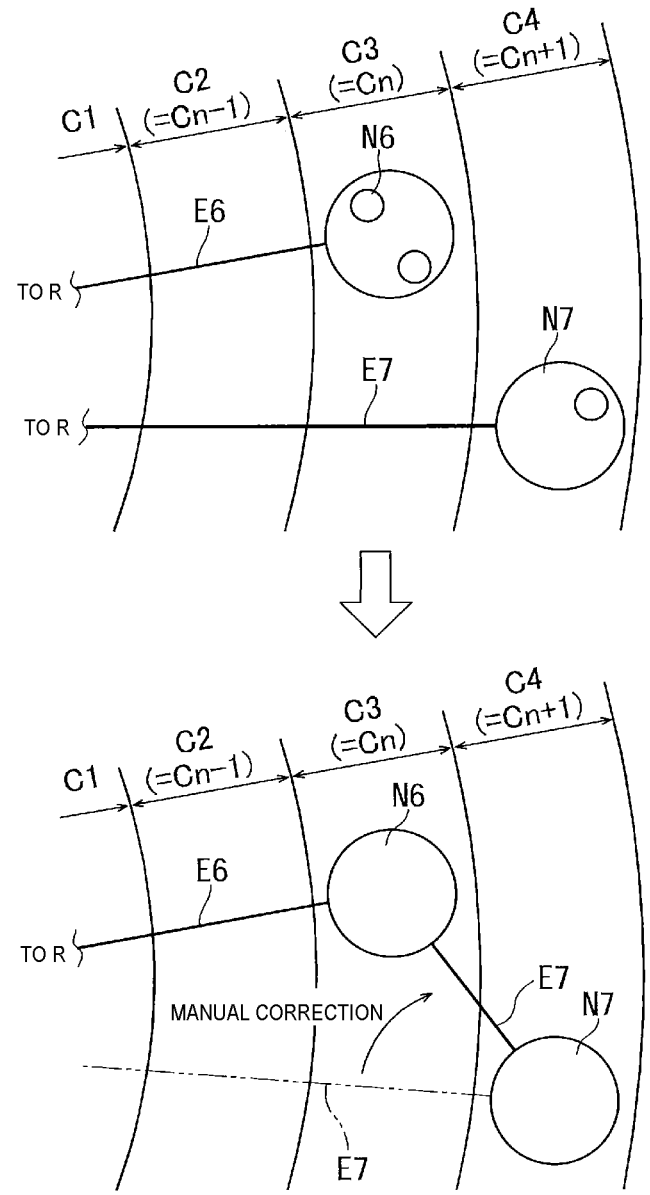
FIG. 12 is an explanatory diagram showing manual correction of an edge of a thesis 7 in the thesis map.

The change in the disposition position and the disposition posture of the edge E will be described in detail with reference to FIGS. 6 and 12 based on a processing example of a thesis 7 relative to a thesis 6. In the thesis map 6, in relation to the thesis 6, a node N6 is represented in the region of the conceptual level C3 and the node N6 is connected to the root R by an edge E6, whereas in relation to the thesis 7, a node N7 is disposed in the region of the provisional conceptual level C4 and the node N7 is connected to the root R by an edge E7 (see an upper portion of FIG. 12). However, when the user rotates the edge E7 around the node N7 to the node E6 by a dragging operation or the like such that a connection target of the edge E7 extending from the node N7 is the node N6 in the region of the conceptual level C3 on an assumption that the connection target of the edge E7 extending from the node N7 is not intended, information thereof is transmitted to the management server 4, and the management server 4 creates correction information based on the information and delivers the map data including the correction information to the user terminal 2. Accordingly, the edge E7 is displayed as connecting the nodes N7 and N6 (see a lower portion of FIG. 12). Such a series of change processing can be set to start, for example, under a condition that the edge E7 or a virtual extension line thereof passes through (crosses) the node N7 and the node N6 due to the rotation (movement) of the edge E7.

Figure 13:
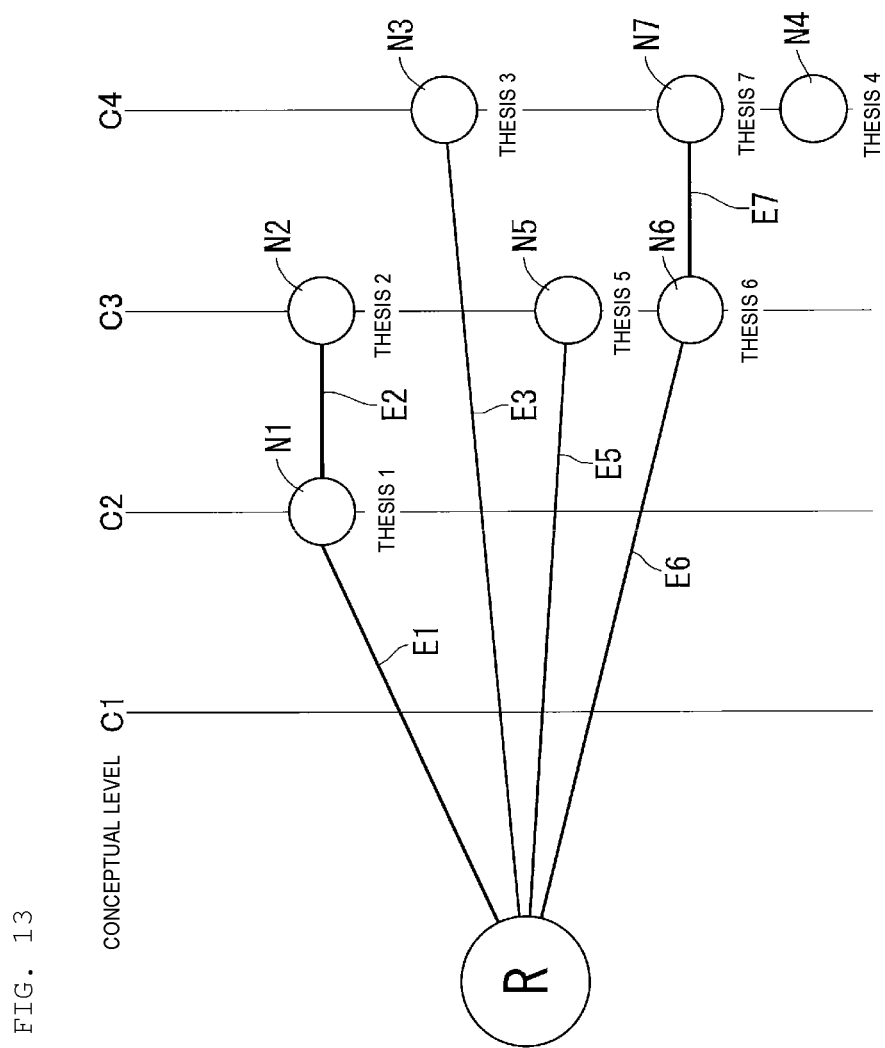
FIG. 13 is an explanatory diagram showing a state in which the thesis map is converted into a tree structure.

(3-2) In such a thesis map 6 (for example, as shown in FIG. 1), a relationship between each of the plurality of conceptual levels C1 to C3 or the provisional conceptual level C4 and each of the nodes N, and a correlation between each of the nodes N and each of the edges E are stored in the storage unit 17, and thus the user can display the thesis map 6 on the user terminal 2 as a tree structure converted as shown in FIG. 13 based on a request signal from the user terminal 2 to the management server 4.

Therefore, in the thesis map creation system 1A, it is possible to create the thesis map 6 that indicates the correlation between the related theses with the node N and the edge E without reading the related theses, and it is possible to easily create and update the thesis map 6. Accordingly, the correlation between the related theses can be ascertained through visual perception, and the research can be advanced in a unique direction. In addition, it is possible to acquire the node N and the edge E of a research content of the user by importing the research content of the user as a thesis, and to enable objective positioning of the research content of the user relative to the related theses.

Even if a content of the thesis map 6 is against an intention of the user (including those in which contents of actual related theses are not accurately reflected), at this time, the thesis map 6 can be easily changed by the change operation on the user terminal 2, and the changed thesis map 6 can be used as the latest thesis map 6. Therefore, it is possible to simplify the creation of the thesis map 6 for research support and to implement accuracy of a content thereof.

Figure 14:
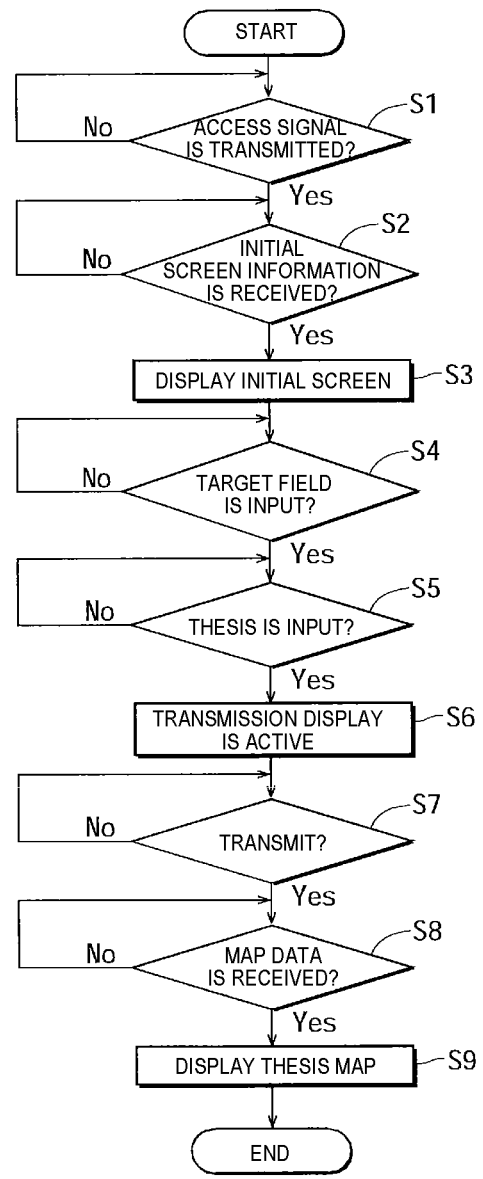
FIG. 14 is a flowchart showing a processing content of the user terminal.

Next, a specific processing example of the above contents in the user terminal 2 will be described with reference to a flowchart shown in FIG. 14. S represents a step.

First, in S1, it is determined whether an access signal is transmitted from the user terminal 2 to the management server 4. When it is determined that the access signal is transmitted (S1 is YES), the initial screen information is transmitted from the management server 4 to the user terminal 2, and thus in S2, it is determined whether the initial screen information from the management server 4 is received. When S2 is YES, the initial screen 31 is displayed on the display unit 8 of the user terminal 2 (S3).

In subsequent S4 and S5, it is determined whether an input of the target field into the target field input field 32 and an input of the thesis information to the thesis input field 33 on the initial screen 31 are performed. When it is determined that the input is performed to both the fields 32 and 33 (YES in S4 and S5), the transmission display 34 on the initial screen 31 is active (S6), and in subsequent S7, it is determined whether the transmission display 34 is selected (clicked) to confirm an intention of transmitting the input information (S4 and S5). When S7 is NO, the determination in S7 is repeated. On the other hand, when S7 is YES, it is determined in S8 whether the map data created based on the transmission of the thesis information and the like is received from the management server 4, and when S8 is YES, the thesis map 6 based on the map data is displayed on the display unit 8 of the user terminal 2 in S9. Accordingly, each node N and each edge E on the thesis map 6 can be recognized through visual perception, and the correlation between the related theses can be intuitively perceived. As a result, the user can advance a research pursuing uniqueness.

Figure 15:
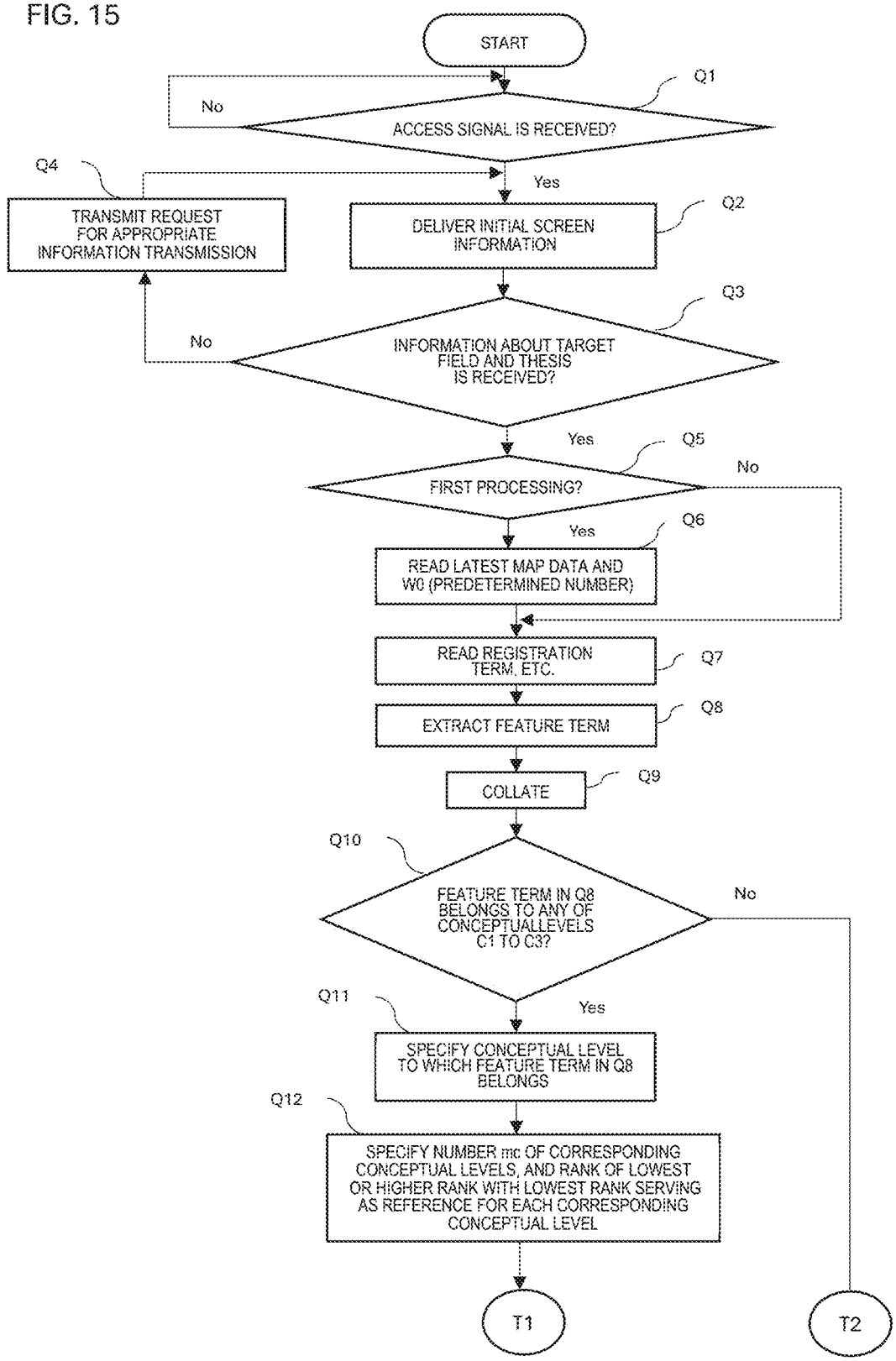
FIG. 15 is a flowchart showing a processing content of a server.
Figure 16:
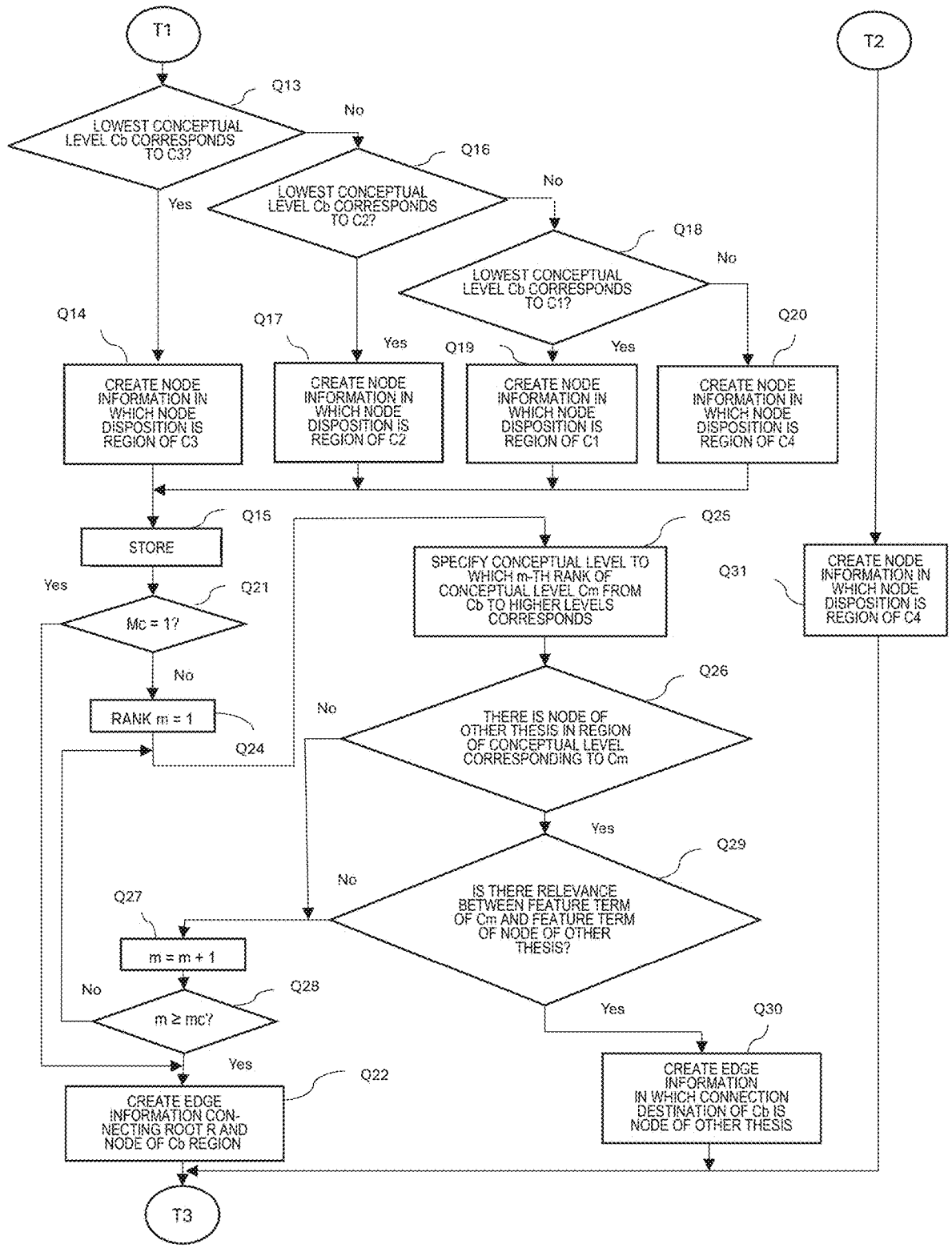
FIG. 16 is a flowchart showing continuation of FIG. 15.
Figure 17:
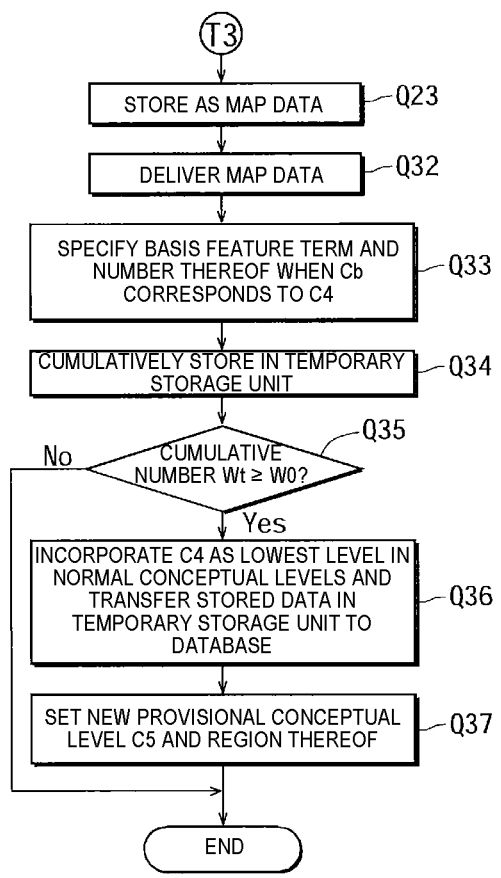
FIG. 17 is a flowchart showing continuation of FIG. 16.

Specific processing examples of the above-described contents in the management server 4 will be described based on flowcharts shown in FIGS. 15 to 17. Q represents a step.

First, in Q1, it is determined whether the access signal from the user terminal 2 is received. When it is determined that the access signal is received (Q1 is YES), the initial screen information is delivered to the user terminal 2 to prompt transmission of the target field and the thesis information (Q2), and the management server 4 stands by for a reply from the user terminal 2.

In subsequent Q3, based on the initial screen information in Q2 described above, it is determined whether information about the target field and the thesis is transmitted. This is because when there is no such information, it is not possible to create the thesis map 6 reflecting the thesis. Therefore, when Q3 is NO, a transmission request for both the target field and the thesis which are appropriate information is transmitted (Q4), the processing returns to Q2, and the initial screen information is delivered again. When Q3 is YES, it is determined in Q5 whether the current processing is processing for a first time, and when Q5 is YES, the latest map data so far (base map data in the case of creation for a first time) and an upper limit value (predetermined number) w0 of the cumulative number of the feature term that can be determined as belonging to the provisional conceptual level are read in Q6, and the registration terms and the like of the conceptual levels C1 to C3 in the target field are read in Q7. When the determination in Q5 is NO, the processing proceeds to Q7.

When processing of Q7 is finished, subsequently, the feature term is extracted by the feature term extraction unit 25 in Q8, and the identity between the extracted feature term and the registration term in the storage unit 17 is collated by the first collating unit 26 in Q9. Then, in subsequent Q10, it is determined whether the extracted feature term belongs to any of the plurality of conceptual levels C1 to C3 based on a result in Q9. A determination aspect in Q10 (an aspect in which the feature term belongs to any of the plurality of conceptual levels C1 to C3) includes a case where as far as at least one of feature terms belongs to any of the plurality of conceptual levels C1 to C3, since it is determined that another feature term does not belong to any of the plurality of conceptual levels C1 to C3, it belongs to the provisional conceptual level C4. When Q10 is YES, in Q11, the conceptual level to which the feature term belongs is specified, in Q12, the number mc of corresponding conceptual levels specified in Q11 is specified, and for each corresponding conceptual level, a rank of lowest and a higher rank with the lowest rank serving as a reference is specified. In this case, as for the corresponding conceptual level specified in Q11, when it is determined that at least one feature term belongs to any of the plurality of conceptual levels C1 to C3 and the other feature term belongs to the provisional conceptual level C4 based on the determination in Q10, it is determined that the provisional conceptual level C4 also corresponds to the corresponding conceptual level (Q11), and at this time, the provisional conceptual level C4 is determined as the lowest conceptual level (Q12).

When processing in Q12 is finished, it is determined in Q13 whether a lowest conceptual level Cb specified in Q12 among the corresponding conceptual levels in Q11 corresponds to the conceptual level C3. When Q13 is YES, node information in which a node disposition position is the region of the conceptual level C3 on the base map is created in Q14, and the node information is stored as the map data in Q15.

When Q13 is NO, it is determined in Q16 whether the lowest conceptual level Cb specified in Q12 corresponds to the conceptual level C2. When Q16 is YES, node information in which the node disposition position is the region of the conceptual level C2 on the base map 13 is created in Q17, the processing proceeds to Q15, and the node information is stored as the map data. When Q16 is NO, it is determined in Q18 whether the lowest conceptual level Cb specified in Q12 corresponds to the conceptual level C1. When Q18 is YES, node information in which the node disposition position is the region of the conceptual level C1 on the base map 13 is created in Q19, the processing proceeds to Q15, and the node information is stored as the map data. When Q18 is NO, since the lowest conceptual level Cb specified in Q12 does not correspond to any of the conceptual levels C1 to C3, at this time, node information in which the node disposition position is the region of the provisional conceptual level C4 on the base map 13 is created in Q20, the processing proceeds to Q15, and the node information is stored as the map data.

When the processing in Q15 is finished, it is determined in Q21 whether the number mc of the corresponding conceptual levels specified in Q12 satisfies mc=1. When Q21 is YES, edge information connecting the root R and the node in the region of the lowest conceptual level Cb is created in Q22 (see the processing example of the thesis 6 in FIG. 6), the edge information is incorporated into the map data, and the map data is stored (updated) as the latest map data in the storage unit 17 in subsequent Q23. On the other hand, when Q21 is NO, in Q24, a rank m of the corresponding conceptual level (Q12) from the lowest conceptual level Cb specified in Q12 to higher levels is set to m=1, and in subsequent Q25, it is specified to which of the conceptual levels C1 to C3 a first corresponding conceptual level Cm (a representative sign for all ranks) from the lowest conceptual level Cb to the higher levels corresponds. In subsequent Q26, it is determined whether there is a node N of another thesis in the region of the conceptual level specified in Q25 to which the conceptual level Cm corresponds (=the conceptual level Cm). When Q26 is NO, in Q27, the rank m is added by 1 (m=m+1) to become a next rank, and in Q28, it is determined whether the rank m is equal to or larger than the number mc of the corresponding conceptual levels specified in Q12. When Q28 is NO, the processing returns to Q25, and it is repeatedly determined whether there is a node N of another thesis sequentially for conceptual levels from the lowest conceptual level Cb to the higher levels among the conceptual levels to which the feature term extracted by the feature term extraction unit 25 belongs. On the other hand, when Q28 is YES, it is determined that there is no node N of another thesis at all conceptual levels higher than the lowest conceptual level Cb among the conceptual levels to which the feature term extracted by the feature term extraction unit 25 belongs, the processing proceeds to Q22, and edge information connecting the node N in the region of the lowest conceptual level Cb and the root R is created.

If Q26 is YES, there is a node N of another thesis at the corresponding conceptual level Cm of an m-th rank (a conceptual level corresponding to Cm), and at this time, it is determined in Q29 whether there is relevance between a feature term that is a basis for the conceptual level Cm and a feature term that is a basis for the node N of the other thesis. This is because that connection between the thesis and the other thesis is determined under a hierarchical conceptual relationship based on presence or absence of the relevance between the feature terms. When Q29 is NO, the processing proceeds to Q27 to perform the determination in Q29 at a conceptual level of a next rank, and when Q29 is YES, in Q30, edge information connecting the node (a node disposed in the region of the lowest conceptual level Cb) N of the thesis and the node N of the other thesis is created (see the processing example of the thesis 2 in FIG. 6) to clarify the connection between the thesis and the other thesis under the hierarchical conceptual relationship, the edge information is incorporated into the map data, and the map data is stored (updated) as the latest map data in the storage unit 17 in Q23.

On the other hand, when it is determined that Q10 is NO, since no feature term in Q8 belongs to any of the conceptual levels C1 to C3, at this time, the processing proceeds to Q31, and node information in which the node disposition position is the region of the provisional conceptual level C4 on the base map is created, such independent (isolated) node information is incorporated into the map data (see the processing of the thesis 4 in FIG. 6), and the map data is stored (updated) as the latest map data in the storage unit 17 in Q23.

When the processing in Q23 is finished, the map data in Q23 is delivered to the user terminal 2 in subsequent Q32. Accordingly, the thesis map 6 is displayed on the display unit 8 of the user terminal 2.

In subsequent Q33, when the lowest conceptual level Cb corresponds to the provisional conceptual level C4, a feature term that is a basis thereof and a number thereof are specified and cumulatively stored in the temporary storage unit 22 of the storage unit 17 in subsequent Q34. In subsequent Q35, it is determined whether the cumulative number wt of the feature term stored in the temporary storage unit 22 is equal to or larger than the predetermined number w0. When Q35 is NO, the processing is ended, whereas when Q35 is YES, in Q36, the provisional conceptual level C4 is incorporated into the map data as the lowest normal conceptual level following the conceptual levels C1 to C3, the feature term stored in the temporary storage unit 22 is stored in the database unit 20 as a registration term of the conceptual level C4, and in Q37, a new provisional conceptual level C5 and a region thereof on the base map are set and stored.

Figure 18:
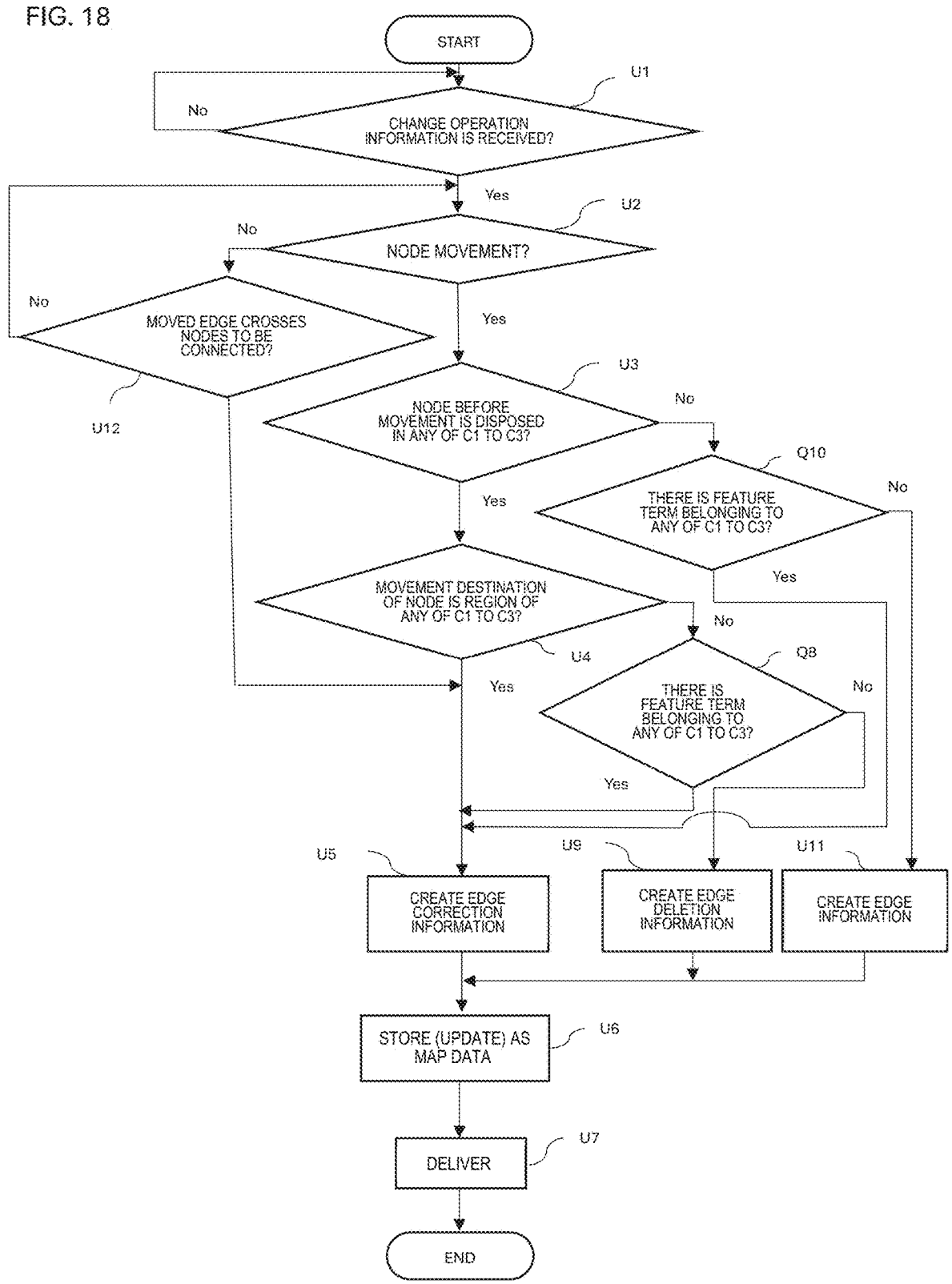
FIG. 18 is a flowchart showing a processing content of the management server along with the manual correction at the user terminal.

FIG. 18 is a flowchart specifically showing processing of the management server 4 along with the change operation on the user terminal 2. U represents a step.

First, when change operation information about the thesis map 6 is received from the user terminal 2 in U1, it is determined in U2 whether the change operation information in U1 is based on node movement. When U2 is YES, it is determined in U3 whether a moved node before movement is disposed in any region of the plurality of conceptual levels C1 to C3, and when U3 is YES, it is determined in U4 whether a movement destination of the moved node is in any region of the plurality of conceptual levels C1 to C3. When U4 is YES, in U5, edge correction information is created, which is adjusted such that the moved node and a partner node so far (including the root R) are connected with an accurate length. In this case, when the moved node and the partner node are located in a region of the same conceptual level, correction is performed such that the moved node and the root R are connected by an edge. Such edge correction information is incorporated into the map data together with the information about the moved node in U6, the map data is stored in the storage unit 17 as the latest map data, and the map data is delivered to the user terminal 2 in subsequent U7. Accordingly, at the user terminal 2, the thesis map 6 showing the moved node and the corrected edge is displayed on the display unit 8 of the user terminal 2.

The timing when U4 is NO is the timing when the moved node moves to the region of the provisional conceptual level C4, and at this time, in 08, in relation to a thesis related to the moved node, it is determined whether there is any feature term extracted by the feature term extraction unit 25 in any of the conceptual levels C1 to C3. When U8 is YES, the processing proceeds to U5, and in U5, the edge correction information that makes a connection state between the moved node moving to the region of the provisional conceptual level C4 and the partner node (including the root R) so far accurate is created. Thereafter, the same processing as described above is performed (U6, U7). When U8 is NO, since the moved node is isolated in the target field, edge deletion information for deleting the edge so far is created in U9, and then the processing proceeds to U6.

The timing when U3 is NO is the timing when the moved node is present at the provisional conceptual level C4 before the movement and moves to any of the conceptual levels C1 to C3 related to the target field. At this time, it is determined in U10 whether there is any feature term extracted by the feature term extraction unit 25 in a region (conceptual levels C1 to C3) other than the movement destination region of the moved node with respect to the thesis related to the moved node. When U10 is YES, the processing proceeds to U5, and in U5, the edge correction information that makes the connection state between the moved node and the partner node (including the root R) so far accurate is created, and thereafter, the same processing as described above is performed (U6, U7). In this case, when the moved node and the partner node are located in a region of the same conceptual level, correction is performed such that the moved node and the root R are connected by an edge. When U10 is NO, only a feature term serving as a basis for the moved node that is isolated before the movement is related to the target field, and thus edge information for newly connecting the root R and the moved node is created in U11, and then the processing proceeds to U6.

The timing when U2 is NO is the timing when a movement operation is performed on the edge E, and at this time, it is determined in U12 whether the moved edge or an extension line thereof crosses both nodes to be connected at the time when the movement is finished. When U12 is NO, the processing returns to U2, and when U12 is YES, the processing proceeds to U5. When the processing reaches U5 through YES in U12 in this way, in U5, edge correction information for accurately connecting both nodes crossed by the moved edge or the extension line thereof is created, and then the processing proceeds to U6.

Figure 19:
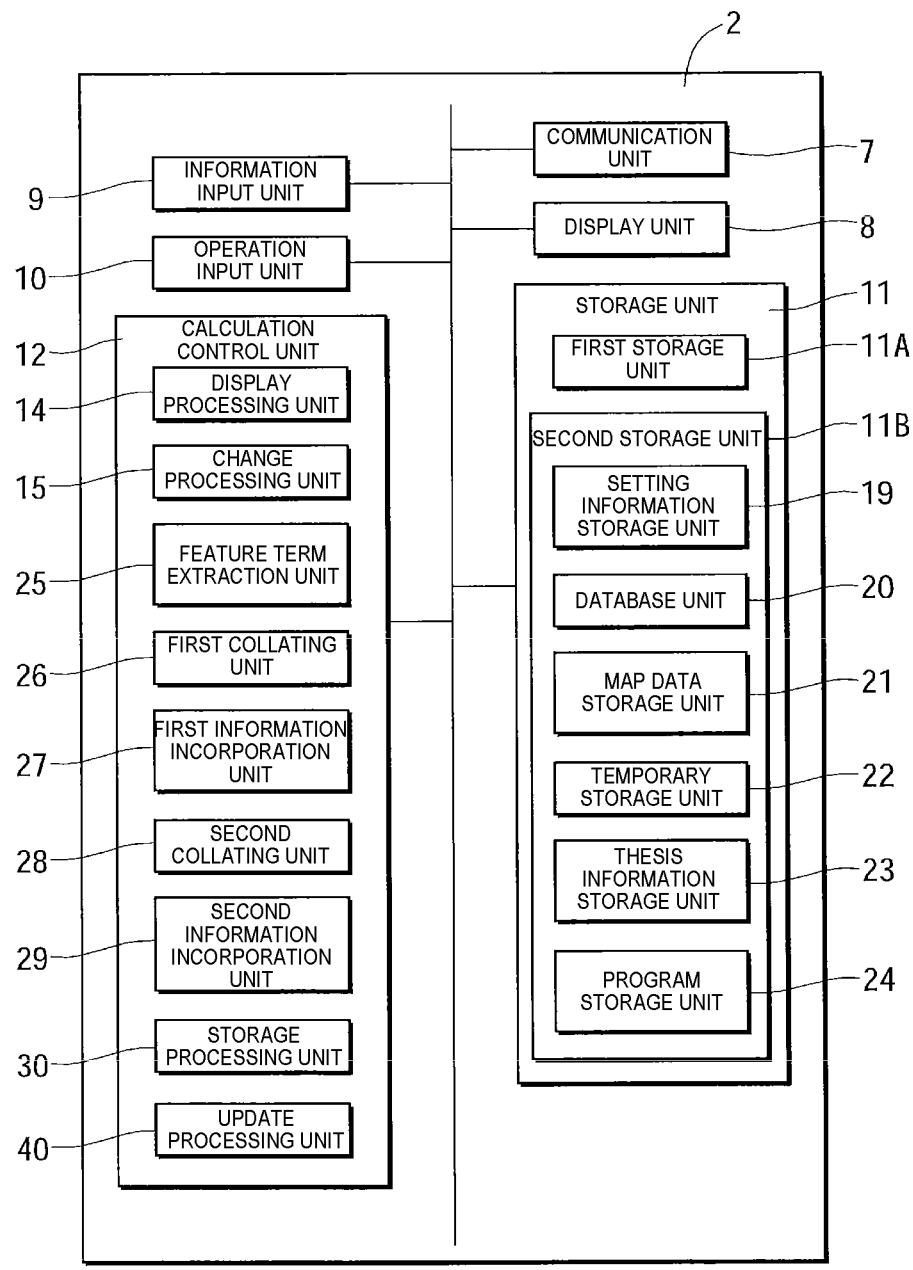
FIG. 19 is a configuration diagram showing a thesis map creation device (user terminal) according to another embodiment.

FIG. 19 shows another embodiment. In the other embodiment, the same components as those in the above-described embodiment are denoted by the same reference numerals, and description thereof is omitted.

In the other embodiment shown in FIG. 19, when creating the thesis map 6, the user terminal 2 (personal computer) that is a terminal device is caused to perform a role performed by the management server 4, and the processing related to the thesis map 6 is completed only by the user terminal 2. Therefore, in the user terminal 2, a first storage unit 11A and a second storage unit 11B are provided in the storage unit 11, the first storage unit 11A has the same function as the storage unit 11 of the user terminal 2 according to the above-described embodiment, and the second storage unit 11B has the same function as the storage unit 17 of the management server 4 according to the above-described embodiment. Therefore, the second storage unit 11B includes the setting information storage unit 19, the database unit 20, the map data storage unit 21, the temporary storage unit 22, the thesis information storage unit 23, and the program storage unit 24, similarly to the storage unit 17 of the management server 4. The calculation control unit 12 includes, in addition to components (the display processing unit 14 and the change processing unit 15) having the same functions as those of the user terminal 2 according to the above-described embodiment, components functioning in the processing unit 18 of the management server 4 according to the above-described embodiment (the feature term extraction unit 25, the first collating unit 26, the first information incorporation unit 27, the second collating unit 28, the second information incorporation unit 29, the storage processing unit 30, and the update processing unit 40).

Accordingly, when related thesis information, own research information (thesis information), and the like are received by the user terminal 2, the user terminal 2 performs processing thereon, and the thesis map 6 is displayed on the display unit 8 of the user terminal 2 as a processing result content.

The invention described in the above-described embodiments includes the following aspects.
 (1) Target theses include theses and research reference materials in a wide range such as natural science, formal science, social science, and humanities.
 (2) The plurality of conceptual levels are not limited to three, that is, C1 to C3, and may be any number like C1 to Cn (n is any integer).
 (3) The virtual planned representation line in the thesis map 6 (base map 13) may be visually unrecognizable or visually recognizable.
 (4) In the base map 13, the regions of the plurality of conceptual levels C1 to C3 are partitioned by spherical surfaces having different diameters around the root R.
 (5) In the base map 13, in order to distinguish the regions of the plurality of conceptual levels C1 to C3, a boundary line may be provided or the regions may be colored differently.
 (6) In the base map 13, in order to distinguish the regions of the plurality of conceptual levels C1 to C3, no boundary line is provided.
 (7) The predetermined number w0 of the cumulative number wt of the feature term w that can be stored in the temporary storage unit 22 is set as desired.
 (8) The following programs can be used as thesis map creation device programs.
 (8-1) A thesis map creation device program for causing a computer to function as the feature term extraction unit 25, the first collating unit 26, and the first information incorporation unit 27.
 (8-2) A thesis map creation device program for causing a computer to function as the feature term extraction unit 25, the first collating unit 26, the first information incorporation unit 27, the second collating unit 28, and the second information incorporation unit 29.
 (8-3) The thesis map creation device program according to the configuration (8-1) or (8-2) described above, in which
 the function of the first information incorporation unit 27 is set such that, when it is determined based on the collating result of the first collating unit 26 that in the feature term extracted by the feature term extraction unit 25, there is the feature term which does not belong to any of the plurality of conceptual levels C1 to C3, the feature term is regarded as belonging to the provisional conceptual level C4, and the thesis position representation information is incorporated in the region of the provisional conceptual level C4 in the base map data 13.
 (8-4) The thesis map creation device program according to (8-3) described above, further causing the computer to function as the storage processing unit 30 and the update processing unit 40.
 (9) The thesis includes a program, software, and the like created in a language such as a programming language or a machine language, for example, Python, JavaScript, and C++. In this case, in order to create a map of the program or the software, for example, a featured object is extracted as a feature term by the feature term extraction unit of the processing device from a type of the programming language used in the program or the software, a content of an application field or the like in which the programming language is used, and a content of a source code or the like used in the program, the software, or the like. Meanwhile, in the storage device, a term that takes into account a change in the programming language used in the application field, a change (simplification, sophistication, and the like) in the source code and the like can be stored as the registration term for each conceptual level.
 (10) The program shown in (8) described above is recorded (stored) in a recording medium.

INDUSTRIAL APPLICABILITY

The invention can be used to easily obtain a thesis map in which a correlation between theses can be ascertained through visual perception.

REFERENCE SIGNS LIST 1 thesis map creation device
1A thesis map creation system (thesis map creation device 1)
2 user terminal (thesis map creation system 1A, thesis map creation device 1)
3 network
4 management server (thesis map creation system 1A)
6 thesis map
8 display unit of user terminal
9 information input unit
13 base map
17 storage unit (storage device) of management server
18 processing unit (processing device) of management server
25 feature term extraction unit
26 first collating unit
27 first information incorporation unit
28 second collating unit
29 second information incorporation unit
30 storage processing unit
40 update processing unit
C1 to C3 plurality of conceptual levels
C4 provisional conceptual level
Cb lowest conceptual level
E edge (line representation)
N node (thesis position representation)
R root (highest element representation)
w feature term

The invention claimed is:

1. A method for creating a thesis map by a thesis map creation device including a processor and a memory, method comprising:

sequentially presenting a plurality of conceptual levels from a higher concept to a lower concept for a target field, storing a term corresponding to each conceptual level for the conceptual level as a registration term, storing a base map that represents each conceptual level as a region that is a lower conceptual level as the region is further away from a highest element representation indicating the target field, and further storing a subsequent base map change content in the memory; and then sequentially executing, by the processor, processing of following (a), (b), (c), and (d):

(a) extracting a feature term from the information about the imported thesis and collating identity between the feature term and the registration term stored in the memory to determine to which of the plurality of conceptual levels stored in the memory the feature term belongs, (b) incorporating, when there is a conceptual level to which the feature term belongs based on a collating result of the identity between the feature term and the registration term, a thesis position representation related to the imported thesis into the base map in a region of a lowest conceptual level among conceptual levels to which the feature term belongs, (c) collating, when the conceptual level to which the feature term belongs is located at a level higher than the lowest conceptual level and there is already a thesis position representation related to another thesis in a region of the same conceptual level as the conceptual level to which the feature term belongs based on the collating result of the identity between the feature term and the registration term and a stored content in the memory, relevance between the feature term and a feature term that is a basis for the thesis position representation of the other thesis at the same conceptual level, and (d) connecting by a line representation, when there is relevance between the collated feature terms, a thesis position representation in the region of the lowest conceptual level to the thesis position representation based on the other thesis in a region of a conceptual level closest to the lowest conceptual level among conceptual levels where the feature terms are relevant, wherein the memory stores, as the base map, a map in which a region of a provisional conceptual level is disposed outside the region of the lowest conceptual level among the plurality of conceptual levels, and when it is determined that there is the feature term which does not belong to any of the plurality of conceptual levels based on the collating result of the identity between the feature term and the registration term, the processor regards the feature term as belonging to the provisional conceptual level and represents, in the region of the provisional conceptual level in the base map, the thesis position representation related to the thesis where the feature term is extracted, further comprising: when the thesis position representation related to the thesis where the feature term is extracted is represented in the region of the provisional conceptual level in the base map, the feature term belongs to any of the plurality of conceptual levels, and there is already a thesis position representation related to another thesis in a region of the same conceptual level as the conceptual level to which the feature term belongs, collating relevance between the feature term and a feature term that is a basis for the thesis position representation related to the other thesis at the same conceptual level; and connecting by a line representation, when there is relevance between the collated feature terms, the thesis position representation in the region of the provisional conceptual level to the thesis position representation related to the other thesis in a region of a conceptual level closest to the provisional conceptual level among conceptual levels where the feature terms are relevant; and connecting by a line representation, when there is no relevance between the collated feature terms, the thesis position representation in the region of the provisional conceptual level to the highest element representation.

2. A method for creating a thesis map by a thesis map creation device including a processor and a memory, the method comprising:

sequentially presenting a plurality of conceptual levels from a higher concept to a lower concept for a target field, storing a term corresponding to each conceptual level for the conceptual level as a registration term, storing a base map that represents each conceptual level as a region that is a lower conceptual level as the region is further away from a highest element representation indicating the target field, and further storing a subsequent base map change content in the memory; and then sequentially executing, by the processor, processing of following (a), (b), (c), and (d):

(a) extracting a feature term from the information about the imported thesis and collating identity between the feature term and the registration term stored in the memory to determine to which of the plurality of conceptual levels stored in the memory the feature term belongs, (b) incorporating, when there is a conceptual level to which the feature term belongs based on a collating result of the identity between the feature term and the registration term, a thesis position representation related to the imported thesis into the base map in a region of a lowest conceptual level among conceptual levels to which the feature term belongs, (c) collating, when the conceptual level to which the feature term belongs is located at a level higher than the lowest conceptual level and there is already a thesis position representation related to another thesis in a region of the same conceptual level as the conceptual level to which the feature term belongs based on the collating result of the identity between the feature term and the registration term and a stored content in the memory, relevance between the feature term and a feature term that is a basis for the thesis position representation of the other thesis at the same conceptual level, and (d) connecting by a line representation, when there is relevance between the collated feature terms, a thesis position representation in the region of the lowest conceptual level to the thesis position representation based on the other thesis in a region of a conceptual level closest to the lowest conceptual level among conceptual levels where the feature terms are relevant, wherein the memory stores, as the base map, a map in which a region of a provisional conceptual level is disposed outside the region of the lowest conceptual level among the plurality of conceptual levels, and when it is determined that there is the feature term which does not belong to any of the plurality of conceptual levels based on the collating result of the identity between the feature term and the registration term, the processor regards the feature term as belonging to the provisional conceptual level and represents, in the region of the provisional conceptual level in the base map, the thesis position representation related to the thesis where the feature term is extracted, further comprising: cumulatively storing, each time when it is determined that the feature term belongs to the provisional conceptual level, the feature term and a number thereof in the memory; and incorporating, when a cumulative number of the stored feature term is equal to or larger than a predetermined number, the provisional conceptual level into the plurality of conceptual levels as a lowest conceptual level of the plurality of conceptual levels in the memory, regarding the stored feature term as a registration term belonging to the lowest conceptual level of the plurality of conceptual levels, and setting a new provisional conceptual level outside the region of the lowest conceptual level incorporated into the plurality of conceptual levels in the base map.

3. A method, for creating a thesis map by a thesis map creation device including a processor and a memory, the method comprising:

sequentially presenting a plurality of conceptual levels from a higher concept to a lower concept for a target field, storing a term corresponding to each conceptual level for the conceptual level as a registration term, storing a base map that represents each conceptual level as a region that is a lower conceptual level as the region is further away from a highest element representation indicating the target field, and further storing a subsequent base map change content in the memory; and then sequentially executing, by the processor, processing of following (a) and (b):

(a) extracting a feature term from the information about the imported thesis and collating identity between the feature term and the registration term stored in the memory to determine to which of the plurality of conceptual levels stored in the memory the feature term belongs, (b) incorporating, when there is a conceptual level to which the feature term belongs based on a collating result of the identity between the feature term and the registration term, a thesis position representation related to the imported thesis into the base map in a region of a lowest conceptual level among conceptual levels to which the feature term belongs, wherein the memory stores, as the base map, a map in which a region of a provisional conceptual level is disposed outside the region of the lowest conceptual level among the plurality of conceptual levels, and when it is determined that there is the feature term which does not belong to any of the plurality of conceptual levels based on the collating result of the identity between the feature term and the registration term, the processor regards the feature term as belonging to the provisional conceptual level and represents, in the region of the provisional conceptual level in the base map, the thesis position representation related to the thesis where the feature term is extracted, further comprising: cumulatively storing, each time when it is determined that the feature term belongs to the provisional conceptual level, the feature term and a number thereof in the memory; and incorporating, when a cumulative number of the stored feature term is equal to or larger than a predetermined number, the provisional conceptual level into the plurality of conceptual levels as a lowest conceptual level of the plurality of conceptual levels in the memory, regarding the stored feature term as a registration term belonging to the lowest conceptual level of the plurality of conceptual levels, and setting a region of a new provisional conceptual level outside the region of the lowest conceptual level incorporated into the plurality of conceptual levels in the base map.

4. A thesis map creation device comprising:

a processor importing information about a thesis; and a memory sequentially presenting a plurality of conceptual levels from a higher concept to a lower concept for each target field, storing a term corresponding to each conceptual level for the conceptual level as a registration term, storing base map data that represents each conceptual level as a region that is a lower conceptual level as the region is further away from a highest element representation indicating the target field, and further storing a subsequent base map data change content, wherein the processor includes:

a feature term extraction unit extracting a feature term from the information about the imported thesis;

a first collating unit collating identity between the feature term extracted by the feature term extraction unit and the registration term of the memory to determine to which of the plurality of conceptual levels the feature term belongs;

a first information incorporation unit incorporating, into the base map data, when it is determined based on a result of the first collating unit that there is a conceptual level to which the feature term belongs, thesis position representation information about the imported thesis in a region of a lowest conceptual level among conceptual levels to which the feature term belongs;

a second collating unit collating, when it is determined based on the result of the first collating unit that the feature term is present at a conceptual level higher than the lowest conceptual level and it is determined based on a stored content in the memory that there is already a thesis position representation related to another thesis in a region of the same conceptual level as the conceptual level to which the feature term belongs, relevance between the feature term and a feature term that is a basis for the thesis position representation of the other thesis at the same conceptual level; and a second information incorporation unit connecting by a line representation, when it is determined based on a result of the second collating unit that there is relevance between the collated feature terms, a thesis position representation in the region of the lowest conceptual level to the thesis position representation related to the other thesis in a region of a conceptual level closest to the lowest conceptual level among conceptual levels where the feature terms are relevant, wherein the memory stores, as the base map data, data in which a region of a provisional conceptual level is disposed outside the region of the lowest conceptual level among the plurality of conceptual levels, and when it is determined that in the feature term extracted by the feature term extraction unit, there is the feature term which does not belong to any of the plurality of conceptual levels based on the collating result of the first collating unit, the first information incorporation unit regards the feature term as belonging to the provisional conceptual level and incorporates the thesis position representation information into the region of the provisional conceptual level in the base map data, wherein when the first information incorporation unit incorporates the thesis position representation information about the thesis where the feature term is extracted into the region of the provisional conceptual level in the base map data, and it is determined based on the collating result of the first collating unit and the stored content in the memory that the feature term belongs to any of the plurality of conceptual levels and that there is already a thesis position representation related to another thesis in a region of the same conceptual level as the conceptual level to which the feature term belongs, the second collating unit collates relevance between the feature term and a feature term that is a basis for the thesis position representation related to the other thesis at the same conceptual level, and when there is relevance between the collated feature terms, the second information incorporation unit connects by a line representation, the thesis position representation in the region of the provisional conceptual level to the thesis position representation related to the other thesis in a region of a conceptual level closest to the provisional conceptual level among conceptual levels where the feature terms are relevant, and when there is no relevance between the collated feature terms, the second information incorporation unit connects by a line representation, the thesis position representation in the region of the provisional conceptual level to the highest element representation.

5. A thesis map creation comprising:

a processor importing information about a thesis; and a memory sequentially presenting a plurality of conceptual levels from a higher concept to a lower concept for each target field, storing a term corresponding to each conceptual level for the conceptual level as a registration term, storing base map data that represents each conceptual level as a region that is a lower conceptual level as the region is further away from a highest element representation indicating the target field, and further storing a subsequent base map data change content, wherein the processor includes:

a feature term extraction unit extracting a feature term from the information about the imported thesis;

a first collating unit collating identity between the feature term extracted by the feature term extraction unit and the registration term of the memory to determine to which of the plurality of conceptual levels the feature term belongs;

a first information incorporation unit incorporating, into the base map data, when it is determined based on a result of the first collating unit that there is a conceptual level to which the feature term belongs, thesis position representation information about the imported thesis in a region of a lowest conceptual level among conceptual levels to which the feature term belongs;

a second collating unit collating, when it is determined based on the result of the first collating unit that the feature term is present at a conceptual level higher than the lowest conceptual level and it is determined based on a stored content in the memory that there is already a thesis position representation related to another thesis in a region of the same conceptual level as the conceptual level to which the feature term belongs, relevance between the feature term and a feature term that is a basis for the thesis position representation of the other thesis at the same conceptual level; and a second information incorporation unit connecting by a line representation, when it is determined based on a result of the second collating unit that there is relevance between the collated feature terms, a thesis position representation in the region of the lowest conceptual level to the thesis position representation related to the other thesis in a region of a conceptual level closest to the lowest conceptual level among conceptual levels where the feature terms are relevant, wherein the memory stores, as the base map data, data in which a region of a provisional conceptual level is disposed outside the region of the lowest conceptual level among the plurality of conceptual levels, and when it is determined that in the feature term extracted by the feature term extraction unit, there is the feature term which does not belong to any of the plurality of conceptual levels based on the collating result of the first collating unit, the first information incorporation unit regards the feature term as belonging to the provisional conceptual level and incorporates the thesis position representation information into the region of the provisional conceptual level in the base map data, wherein the processing further includes:

a storage processing unit cumulatively storing, each time when it is determined that the feature term belongs to the provisional conceptual level based on the collating result of the first collating unit, the feature term and a number thereof in the memory; and an update processing unit incorporating, when it is determined that a cumulative number of the stored feature term is equal to or larger than a predetermined number based on the stored content in the memory, the provisional conceptual level into the plurality of conceptual levels as a lowest conceptual level of the plurality of conceptual levels in the memory, storing the stored feature term as a registration term belonging to the lowest conceptual level of the plurality of conceptual levels, and set a new provisional conceptual level outside the region of the conceptual level incorporated into the plurality of conceptual levels as the lowest conceptual level in the base map.

6. A thesis map creation device comprising:

a processor importing information about a thesis; and a memory sequentially presenting a plurality of conceptual levels from a higher concept to a lower concept for each target field, storing a term corresponding to each conceptual level for the conceptual level as a registration term, storing base map data that represents each conceptual level as a region that is a lower conceptual level as the region is further away from a highest element representation indicating the target field, and further storing a subsequent base map data change content, wherein the processor includes:

a feature term extraction unit extracting a feature term from the information about the imported thesis;

a first collating unit collating identity between the feature term extracted by the feature term extraction unit and the registration term of the memory to determine to which of the plurality of conceptual levels the feature term belongs;

a first information incorporation unit incorporating, into the base map data, when it is determined based on a result of the first collating unit that there is a conceptual level to which the feature term belongs, thesis position representation information about the imported thesis in a region of a lowest conceptual level among conceptual levels to which the feature term belongs;

wherein the memory stores, as the base map data, data in which a region of a provisional conceptual level is disposed outside the region of the lowest conceptual level among the plurality of conceptual levels, and when it is determined that in the feature term extracted by the feature term extraction unit, there is the feature term which does not belong to any of the plurality of conceptual levels based on the collating result of the first collating unit, the first information incorporation unit regards the feature term as belonging to the provisional conceptual level and incorporates the thesis position representation information into the region of the provisional conceptual level in the base map data, wherein the processor further includes:

a storage processing unit cumulatively storing, each time when it is determined that the feature term belongs to the provisional conceptual level based on the collating result of the first collating unit, the feature term and a number thereof in the memory; and an update processing unit incorporating, when it is determined that a cumulative number of the stored feature term is equal to or larger than a predetermined number based on the stored content in the memory, the provisional conceptual level into the plurality of conceptual levels as a lowest conceptual level of the plurality of conceptual levels in the memory, store the stored feature term as a registration term belonging to the lowest conceptual level of the plurality of conceptual levels, and set a region of a new provisional conceptual level outside the region of the conceptual level incorporated into the plurality of conceptual levels as the lowest conceptual level in the base map.

7. The thesis map creation device according to claim 6, further comprising: a terminal device; and a management server with which the terminal device is communicable via a network, wherein the terminal device includes an information input unit importing of thesis information and a display unit displaying delivery information from the management server, and the management server includes the memory and the processor.

8. The thesis map creation device according to claim 6, further comprising: a terminal device, wherein the terminal device includes an information input unit importing thesis information, the memory, the processor, and a display unit displaying processing information from the processor.

* * * * *